US012762767B2

(12) United States Patent
Murasawa et al.

(10) Patent No.: US 12,762,767 B2
(45) Date of Patent: Oct. 13, 2026

(54) INFORMATION PROCESSING APPARATUS AND METHOD FOR CONTROLLING THE SAME

(71) Applicant: CANON KABUSHIKI KAISHA, Tokyo (JP)

(72) Inventors: Kouta Murasawa, Kanagawa (JP); Takayuki Yamada, Kanagawa (JP); Kazuya Ogasawara, Kanagawa (JP); Shinjiro Hori, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 81 days.

(21) Appl. No.: 18/342,177

(22) Filed: Jun. 27, 2023

(65) Prior Publication Data

US 2023/0419572 A1 Dec. 28, 2023

(30) Foreign Application Priority Data

Jun. 28, 2022 (JP) ................................ 2022-104049

(51) Int. Cl.
*G06T 11/60* (2026.01)

(52) U.S. Cl.
CPC .......... *G06T 11/60* (2013.01); *G06T 2200/24* (2013.01)

(58) Field of Classification Search
CPC ............................ G06T 11/60; G06T 2200/24
See application file for complete search history.

(56) References Cited

U.S. PATENT DOCUMENTS

2003/0137541 A1 7/2003 Massengale
2004/0075669 A1* 4/2004 Bronstein ............... G06T 11/60 345/619
2006/0181736 A1 8/2006 Quek
2008/0222560 A1 9/2008 Harrison
2011/0016385 A1 1/2011 Kasuga
2015/0278163 A1 10/2015 Kinkoh
2015/0348249 A1 12/2015 Yamamoto
2016/0063746 A1* 3/2016 Furuya .................... G06T 11/60 382/209
2016/0173944 A1 6/2016 Kilar
2017/0352083 A1 12/2017 Ruck
2018/0268586 A1* 9/2018 Furuya .................... G06T 7/136
2019/0371027 A1* 12/2019 Noguchi ................ G06T 11/60
2023/0070390 A1 3/2023 Weng
2023/0080407 A1 3/2023 Kumar
2025/0329134 A1 10/2025 Minegishi

FOREIGN PATENT DOCUMENTS

EP 4538957 A1 4/2025
JP 2003132359 A 5/2003
JP 2006113910 A 4/2006

(Continued)

OTHER PUBLICATIONS

Takanobu Obata et al., A Color Poster Creating Support System to Reflect Kansei, Mar. 2000, vol. 41 No. 3.

*Primary Examiner* — King Y Poon
*Assistant Examiner* — Vincent Alexander Providence
(74) *Attorney, Agent, or Firm* — Canon U.S.A., Inc. IP Division

(57) ABSTRACT

An image is acquired. An input of aimed impression is received from a user. Based on the aimed impression, the image is adjusted. A poster is created by using the adjusted image.

14 Claims, 22 Drawing Sheets

(56) References Cited

FOREIGN PATENT DOCUMENTS

| | | | | | |
|---|---|---|---|---|---|
| JP | 2006221601 | A | | 8/2006 | |
| JP | 2008299365 | A | | 12/2008 | |
| JP | 2010033551 | A | | 2/2010 | |
| JP | 2015162850 | A | * | 9/2015 | ........... H04N 1/3873 |
| JP | 2015200983 | A | | 11/2015 | |
| JP | 2016048408 | A | | 4/2016 | |
| JP | 2018120338 | A | | 8/2018 | |
| JP | 6537419 | B2 | | 7/2019 | |
| JP | 2020046994 | A | | 3/2020 | |
| JP | 6958096 | B2 | | 11/2021 | |
| KR | 20200080577 | A | * | 7/2020 | ......... G06F 3/04845 |
| WO | WO-2015129328 | A1 | * | 9/2015 | ........... H04N 1/3873 |

* cited by examiner

FIG. 3A

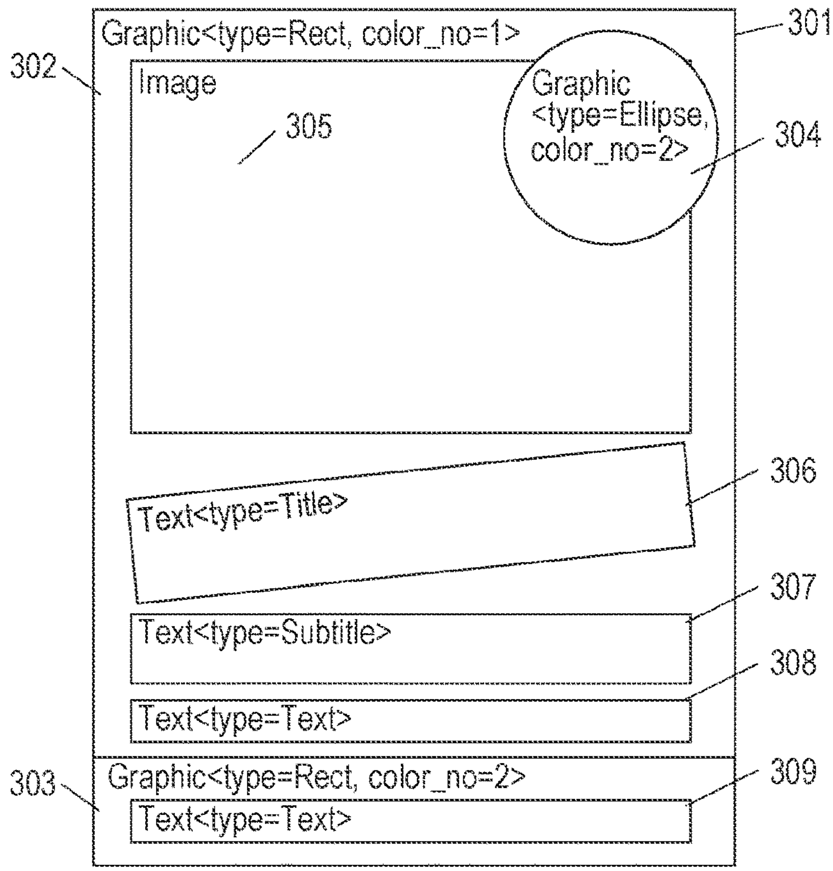

FIG. 3B

| OBJECT | METADATA | VALUE (OR ATTRIBUTE) |
|---|---|---|
| GRAPHICS (Graphics) | type (SHAPE) | Rect (RECTANGLE)<br>Ellipse (ELLIPSE)<br>... |
| | color_no (COLOR ARRANGEMENT NUMBER) | INTEGER |
| IMAGE (Image) | Type | Rect (RECTANGLE)<br>Ellipse (ELLIPSE)<br>... |
| CHARACTER STRING (Text) | type (TYPE) | Title (TITLE)<br>SubTitle (SUB-TITLE)<br>Text (TEXT BODY) |
| | CHARACTER POSITION | RIGHT-JUSTIFIED<br>CENTER<br>LEFT-JUSTIFIED |
| | ORIENTATION | HORIZONTAL WRITING<br>VERTICAL WRITING |
| SKELETON | USE CATEGORY | FOR RESTAURANTS<br>FOR SPORTS<br>FOR SCHOOLS<br>... |

FIG. 4

| IMPRESSION | CHROMA | LIGHTNESS | COLOR TONE | NUMBER OF COLORS | EDGE AMOUNT |
| --- | --- | --- | --- | --- | --- |
| SENSE OF AFFINITY | MEDIUM | – | – | MEDIUM | SMALL |
| SENSE OF DYNAMISM | HIGH | – | R TO YR | MANY | LARGE |
| SENSE OF MASSIVENESS | LOW | LOW | – | – | – |
| SENSE OF LUXURY | – | – | – | – | – |

FIG. 7
1. Very
2. Somewhat
3. Neutral
4. Somewhat
5. Very
Bright
Dark
Deep
Pale
Heavy
Light
Strong
Weak
Hot
Sweet

| SKELETON NAME | SENSE OF LUXURY | SENSE OF AFFINITY | SENSE OF DYNAMISM | SENSE OF MASSIVENESS |
|---|---|---|---|---|
| SKELETON 1 | −1 | −1 | −2 | 0 |
| SKELETON 2 | −1 | +2 | +1 | −2 |
| SKELETON 3 | 0 | −1 | +2 | +1 |
| SKELETON 4 | +1 | −2 | −2 | +2 |

| SKELETON NAME | DISTANCE |
|---|---|
| SKELETON 1 | 2.8 |
| SKELETON 2 | 4.7 |
| SKELETON 3 | 4.2 |
| SKELETON 4 | 1 |

FIG. 15A

| COLOR ARRANGEMENT ID | COLOR 1 | COLOR 2 | COLOR 3 | COLOR 4 | SENSE OF LUXURY | SENSE OF AFFINITY | SENSE OF DYNAMISM | SENSE OF MASSIVENESS |
|---|---|---|---|---|---|---|---|---|
| 1 | (0, 68, 69) | (44, 120, 108) | (250, 245, 228) | (248, 180, 0) | −1 | +1 | −2 | +2 |
| 2 | (157, 37, 3) | (223, 133, 67) | (241, 241, 176) | (127, 169, 151) | −2 | 0 | +2 | +1 |
| 3 | (245, 176, 203) | (213, 151, 206) | (116, 92, 151) | (57, 55, 91) | +2 | 0 | −1 | −1 |
| 4 | (255, 255, 199) | (169, 241, 223) | (30, 174, 152) | (35, 62, 139) | +1 | +2 | −1 | −2 |

. . .

FIG. 15B

| FONT ID | TITLE FONT | TEXT-BODY FONT | SENSE OF LUXURY | SENSE OF AFFINITY | SENSE OF DYNAMISM | SENSE OF MASSIVENESS |
|---|---|---|---|---|---|---|
| 1 | FONT 5 | FONT 2 | −1 | +2 | +2 | −1 |
| 2 | FONT 8 | FONT 1 | +2 | +2 | +1 | −2 |
| 3 | FONT 12 | FONT 1 | +1 | +1 | −1 | +1 |
| 4 | FONT 6 | FONT 1 | +1 | −1 | 0 | 0 |

. . .

| SETTING ITEM | SETTING CONTENT |
|---|---|
| TITLE | GREAT APPRECIATION SUMMER SALE |
| SUB-TITLE | BEAT THE MID-SUMMER HEAT! |
| TEXT | (NO SETTING MADE) |
| IMAGE |   |

| COLOR ARRANGEMENT ID | COLOR 1 | COLOR 2 | COLOR 3 | COLOR 4 |
|---|---|---|---|---|
| 1 | (0, 68, 69) | (44, 120, 108) | (250, 245, 228) | (248, 180, 0) |
| 4 | (255, 255, 199) | (169, 241, 223) | (30, 174, 152) | (35, 62, 139) |

| FONT ID | TITLE FONT | TEXT-BODY FONT |
|---|---|---|
| 2 | FONT 8 | FONT 1 |
| 3 | FONT 12 | FONT 1 |

FIG. 19A

| SKELETON ID | FILE NAME |
|---|---|
| 1 | SKELETON 1 |
| 2 | SKELETON 2 |
| 3 | SKELETON 3 |
| 4 | SKELETON 4 |
| ... | |

FIG. 19B

| FONT ID | TITLE FONT | TEXT-BODY FONT |
|---|---|---|
| 1 | FONT 5 | FONT 2 |
| 2 | FONT 8 | FONT 1 |
| 3 | FONT 12 | FONT 1 |
| 4 | FONT 6 | FONT 1 |
| ... | | |

FIG. 19C

| COLOR ARRANGEMENT ID | COLOR 1 | COLOR 2 | COLOR 3 | COLOR 4 |
|---|---|---|---|---|
| 1 | (0, 68, 69) | (44, 120, 108) | (250, 245, 228) | (248, 180, 0) |
| 2 | (157, 37, 3) | (223, 133, 67) | (241, 241, 176) | (127, 169, 151) |
| 3 | (245, 176, 203) | (213, 151, 206) | (116, 92, 151) | (57, 55, 91) |
| 4 | (255, 255, 199) | (169, 241, 223) | (30, 174, 152) | (35, 62, 139) |
| ... | | | | |

FIG. 19D

| COMBINATION ID | SKELETON ID | COLOR ARRANGEMENT ID | FONT ID |
|---|---|---|---|
| 1 | 1 | 9 | 2 |
| 2 | 5 | 4 | 6 |
| 3 | 3 | 10 | 4 |
| 4 | 8 | 4 | 9 |
| ... | | | |
| 100 | 10 | 3 | 21 |

FIG. 20A

| COMBINATION ID | SKELETON ID | COLOR ARRANGEMENT ID | FONT ID | DISTANCE |
|---|---|---|---|---|
| 1 | 1 | 9 | 2 | 1.2 |
| 2 | 5 | 4 | 6 | 0.7 |
| 3 | 3 | 10 | 4 | 1.1 |
| 4 | 8 | 4 | 9 | 2.3 |
| ... | | | | |
| 100 | 10 | 3 | 21 | 1.5 |

FIG. 20B

| COMBINATION ID | SKELETON ID | COLOR ARRANGEMENT ID | FONT ID |
|---|---|---|---|
| 1 | 1 | 10 | 2 |
| 2 | 3 | 9 | 4 |
| 3 | 10 | 3 | 6 |
| 4 | 5 | 4 | 21 |
| ... | | | |
| 100 | 3 | 5 | 13 |

FIG. 21A
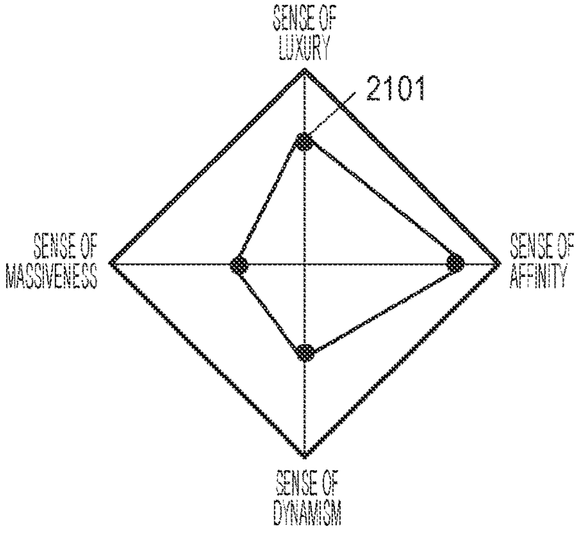
FIG. 21B
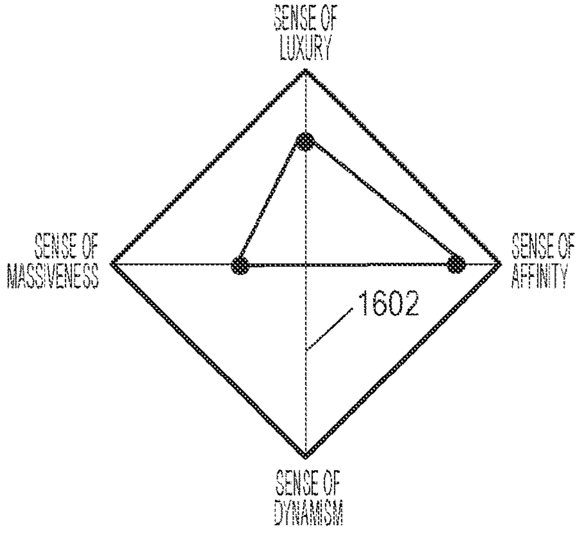
FIG. 21C
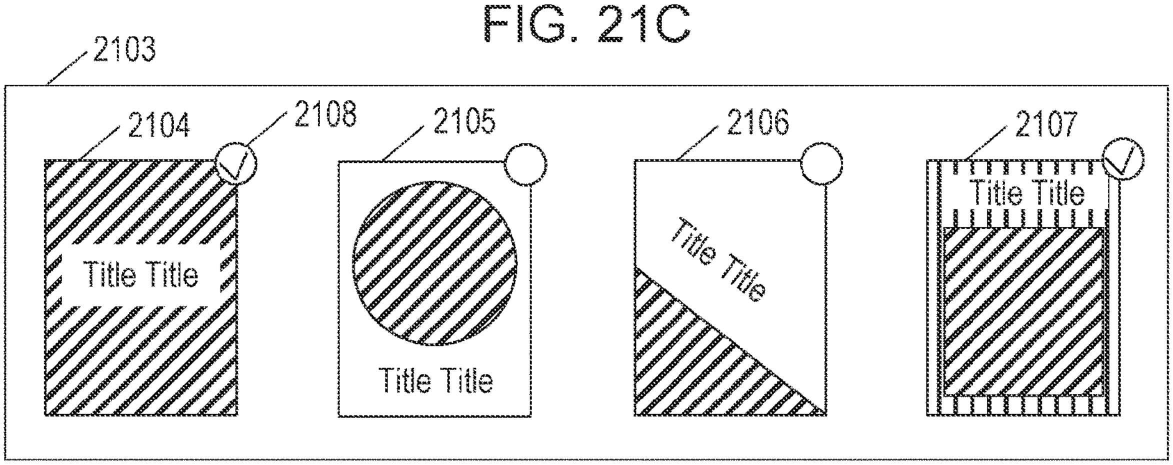
FIG. 21D
| POSTER | SELECTED STATE | SENSE OF LUXURY | SENSE OF AFFINITY | SENSE OF DYNAMISM | SENSE OF MASSIVENESS |
|---|---|---|---|---|---|
| 1604 | ✓ | +2 | −0.5 | −0.1 | +0.1 |
| 1605 | | 0 | +2 | +0.1 | −0.2 |
| 1606 | | +0.4 | −0.1 | +2 | +0.2 |
| 1607 | ✓ | −0.1 | 0 | +0.3 | +2 |
| AIMED IMPRESSION | | +2 | −0.5 | +0.3 | +2 |

INFORMATION PROCESSING APPARATUS AND METHOD FOR CONTROLLING THE SAME

BACKGROUND OF THE DISCLOSURE

Field of the Disclosure

The present disclosure relates to a technique for creating a poster.

Description of the Related Art

In related art, the following method for creating a poster has been proposed. A template that contains information such as shapes and layouts of images, characters, graphics and the like that are poster-constituting elements has been prepared in advance. The images, the characters, the graphics and the like are arranged in accordance with the template, thereby creating a poster.

In Japanese Patent Laid-Open No. 2016-048408, a template that is close to an impression of an image is detected, and an image is adjusted in such a way as to bring its impression closer to the impression of the template.

However, though an image adjustment is made in such a way as to bring its impression closer to the impression of the template in Japanese Patent Laid-Open No. 2016-048408, an impression intended by a user is not always inherent in an inputted image. Moreover, even when an image adjustment is made in such a way as to bring its impression closer to the impression of the template found by performing a search based on the impression of the image, the adjustment result does not always give the impression intended by the user. That is, it could happen that the related art fails to create a poster with an image having been adjusted for expressing the impression intended by the user.

SUMMARY OF THE DISCLOSURE

Embodiments of the present disclosure makes it possible to create a poster appropriately while adjusting an image in such a way as to express an impression intended by a user.

An information processing apparatus according to an aspect of the present disclosure includes at least one processor, and a memory that stores a program which, when executed by the at least one processor, causes the at least one processor to function as: an image acquisition unit configured to acquire an image; a receiving unit configured to receive an input of aimed impression from a user; an image adjustment unit configured to, based on the aimed impression, adjust the image; and a poster creation unit configured to create a poster by using the adjusted image.

Further features of the present disclosure will become apparent from the following description of exemplary embodiments with reference to the attached drawings.

BRIEF DESCRIPTION OF THE DRAWINGS

FIG. 3A is a diagram illustrating an example of a skeleton.

FIG. 3B is a diagram illustrating an example of metadata.

FIG. 4 is a diagram illustrating an example of a table for conversion from impression to image feature amount.

FIG. 15A is a diagram for explaining color arrangement patterns.

FIG. 15B is a diagram for explaining font patterns.

FIG. 19A is a diagram for explaining combinations.

FIG. 19B is a diagram for explaining combinations.

FIG. 19C is a diagram for explaining combinations.

FIG. 19D is a diagram for explaining combinations.

FIG. 20A is a diagram for explaining combinations.

FIG. 20B is a diagram for explaining combinations.

FIG. 21A is a diagram for explaining a UI for imputing impression.

FIG. 21B is a diagram for explaining a UI for imputing impression.

FIG. 21C is a diagram for explaining a UI for imputing impression.

FIG. 21D is a diagram for explaining a UI for imputing impression.

DESCRIPTION OF THE EMBODIMENTS

Figure 1:
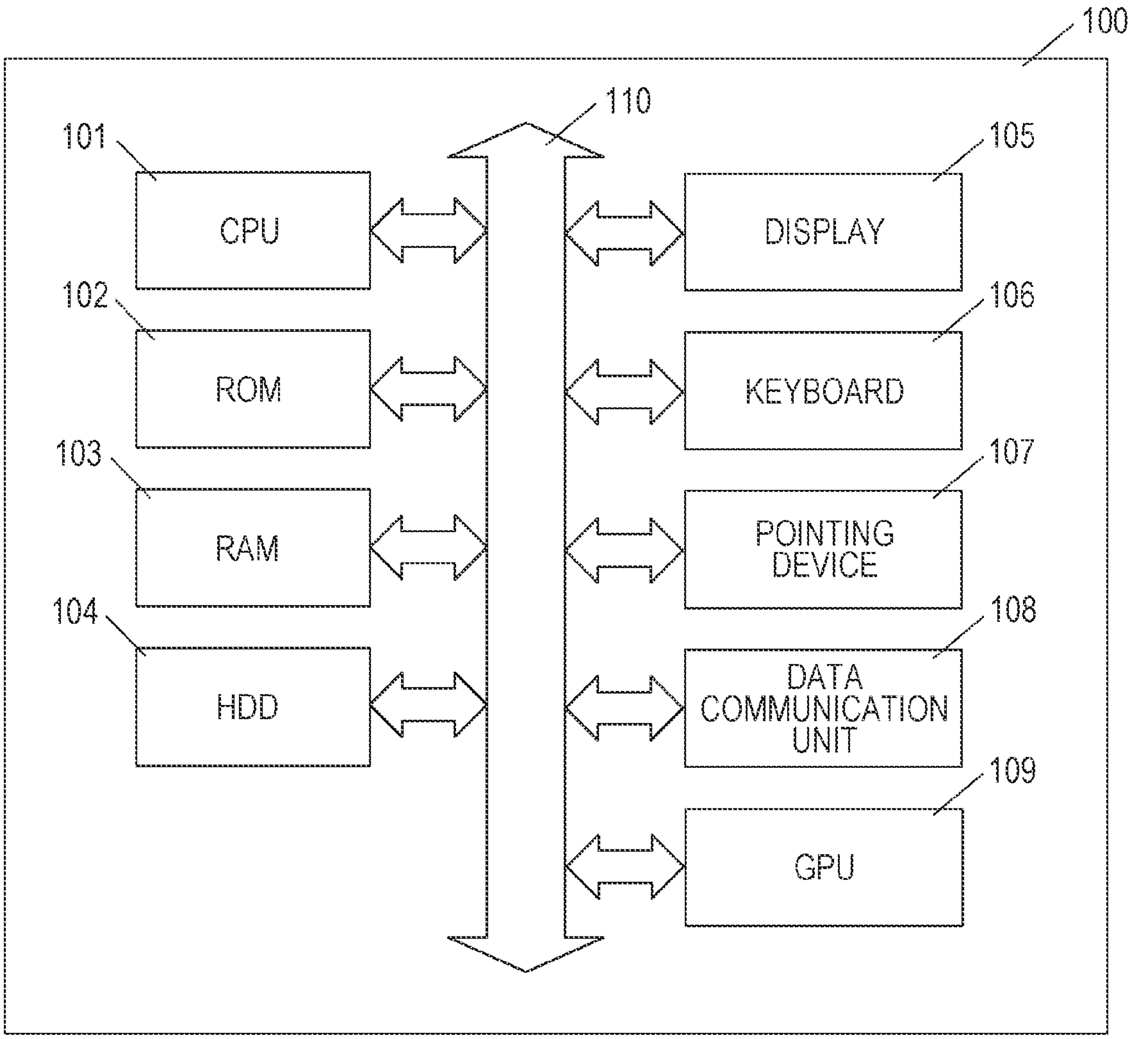
FIG. 1 is a block diagram illustrating a configuration of hardware of an information processing apparatus.

With reference to the accompanying drawings, some embodiments of the present disclosure will now be explained in detail. The embodiments described below shall not be construed to limit the present disclosure recited in the appended claims. Not all of the features described in the embodiments are necessarily required to be combined for providing a solution proposed in the present disclosure. The same reference numerals will be assigned to the same components, and the same explanation will not be repeated.

First Embodiment

System Configuration

In the present embodiment, a method for creating a poster automatically by running an application (hereinafter referred to also as "app") for poster creation in an information processing apparatus will be described as an example. In the description below, the meaning of the term "image" encompasses a still image, and a frame image clipped out of a moving image, unless otherwise specified.

FIG. 1 is a block diagram illustrating a configuration of hardware of an information processing apparatus. An information processing apparatus 100 is, for example, a personal computer (hereinafter abbreviated as "PC"), a smartphone, or the like. In the present embodiment, it is assumed that the information processing apparatus is a PC. The information processing apparatus 100 includes a CPU 101, a ROM 102, a RAM 103, an HDD 104, a display 105, a keyboard 106, a pointing device 107, a data communication unit 108, and a GPU 109.

The CPU (central processing unit/processor) 101 performs central control on the information processing apparatus 100 and realizes operation of the present embodiment by, for example, reading a program stored in the ROM 102 out into the RAM 103 and running the program. Though a single CPU only is illustrated in FIG. 1, it may be comprised of a plurality of CPUs. The ROM 102 is a general-purpose ROM, and, for example, programs to be run by the CPU 101 are stored therein. The RAM 103 is a general-purpose RAM, and, for example, is used as a working memory for temporarily storing various kinds of information during program execution by the CPU 101. The HDD (hard disk drive) 104 is a storage medium (storage unit) configured to store image files, databases storing processing results of image analysis and the like, and skeletons to be used by a poster creation application and the like.

The display 105 is a display unit configured to serve as a user interface (UI) according to the present embodiment and display electronic posters as layout results of image data (hereinafter referred to also as "image"). Though not illustrated, a display control unit configured to control display on the display unit is also included therein. The keyboard 106 and the pointing device 107 receive instructions from a user who operate them.

The display 105 may have a touch sensor function. The keyboard 106 is used when, for example, the user inputs the number of spread pages of a poster which the user wants to create on a UI displayed on the display 105. The pointing device 107 is used when, for example, the user clicks a button on the UI displayed on the display 105.

The data communication unit 108 performs communication with an external device via a wired network, a wireless network, or the like. For example, the data communication unit 108 transmits, to a printer or a server that is capable of communicating with the information processing apparatus 100, layout data obtained by using an automatic layout function. The data bus 110 connects the block components illustrated in FIG. 1 such that interconnected communication can be performed therebetween.

The configuration illustrated in FIG. 1 is just an example, and the scope of the present disclosure is not limited to this example. For example, the display 105 may be omitted, and the information processing apparatus 100 may be configured to display the UI on an external display.

The poster creation application according to the present embodiment is stored in the HDD 104. As will be described later, the poster creation application according to the present embodiment is launched when the user performs an operation of selecting an icon of this application displayed on the display 105 by using the pointing device 107 and then clicking or double-clicking it.

Explanation of Skeleton

In the present embodiment, a skeleton means layout information of a character string(s), an image(s), a graphic(s), and the like that are to be arranged on a poster. FIG. 3A is a diagram illustrating an example of a skeleton. On a skeleton 301 illustrated in FIG. 3A, three graphic objects 302, 303, and 304, one image object 305, and four text objects 306, 307, 308, and 309 are arranged. Metadata that is necessary for creating a poster is also stored in each object, in addition to a position that indicates where to be placed, a size, and an angle. FIG. 3B is a diagram illustrating an example of metadata.

For example, the text objects 306, 307, 308, and 309 have information specifying what kinds of character information are to be arranged as the metadata. In this example, the text object 306 indicates that a title is placed here, the text object 307 indicates that a sub-title is placed here, and the text objects 308 and 309 indicate that text bodies are placed here. The graphic objects 302, 303, and 304 have information about graphic shapes and color arrangement numbers as the metadata. In this example, the graphic objects 302 and 303 indicate rectangles, and the graphic object 304 indicates an ellipse. Color Arrangement Number 1 is assigned to the graphic object 302. Color Arrangement Number 2 is assigned to the graphic objects 303 and 304. The color arrangement number mentioned here is information that is referred to when performing color arrangement, which will be described later. Different color arrangement numbers indicate that different colors are assigned thereto. The types of objects and the metadata are not limited to the examples described above. For example, the objects may include a map object for placing a map thereat, a QR Code®, a barcode object for placing a barcode thereat, or the like. The metadata of the text objects may include metadata that indicates a line-to-line width or a character-to-character width. The intended use of the skeleton may be contained in the metadata so as to be used for controlling whether it is OK to use this skeleton, depending on the use.

The skeleton may be stored in the HDD 104 in, for example, a CSV format, or a DB format such as an SQL.

A skeleton acquisition unit 213 outputs a group of skeletons acquired from the HDD 104 to a skeleton selection unit 214. Though skeleton creation by new designing is possible, it is inefficient to create many skeletons from scratch. Therefore, the creation may be performed while taking an already-created poster as a reference model. If there exists digital data that has information about the structure of an already-created poster, for example, a PDF, it is possible to create a skeleton by analyzing the data. For data that does not have information about the structure, for example, image data such as a JPEG image, it is possible to create a skeleton by manually applying the layout of areas such as an image area(s), a text area(s), and a graphic area(s), the positions thereof, and the metadata thereof, from the data.

Software Block Diagram

Figure 2:
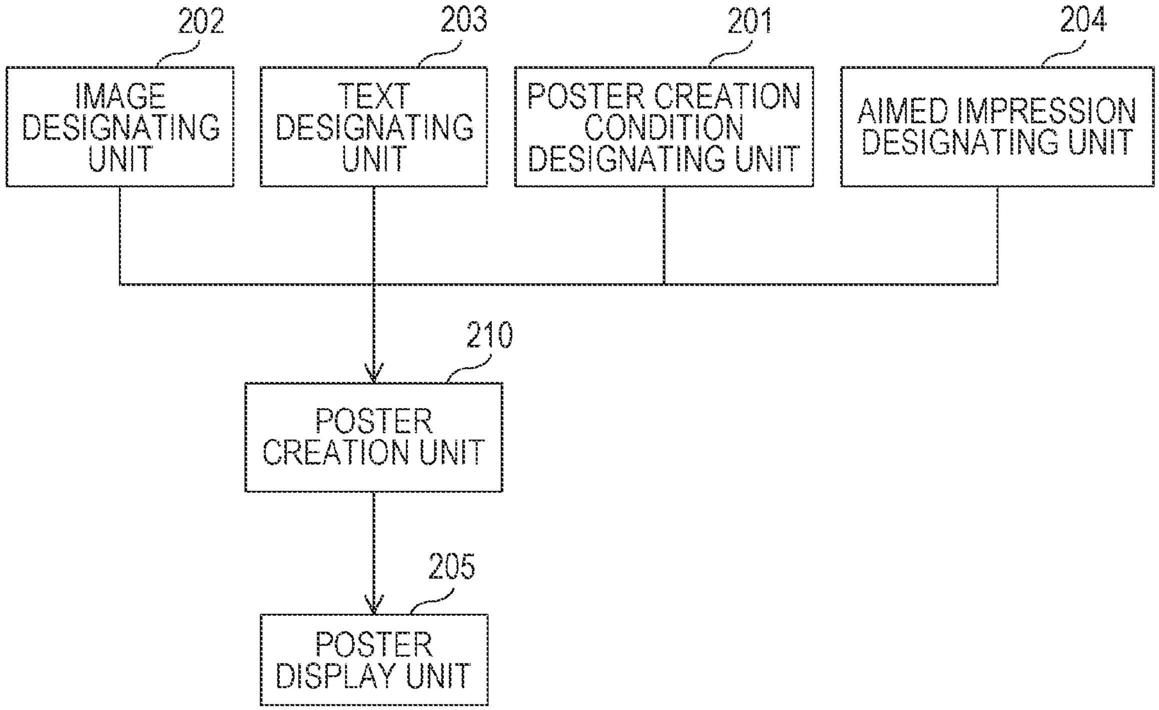
FIG. 2 is a software block diagram of a poster creation application.

FIG. 2 is a software block diagram of the poster creation application. The poster creation application includes a poster creation condition designating unit 201, an image designating unit 202, a text designating unit (text acquisition unit) 203, an aimed impression designating unit 204, a poster display unit 205, and a poster creation unit 210. Program modules that correspond respectively to the components illustrated in FIG. 2 are included in the poster creation application described above. The CPU 101 executes each of these program modules. By this means, the CPU 101 functions as each of the components illustrated in FIG. 2. To explain the components illustrated in FIG. 2, it is assumed in the description below that these components perform various kinds of processing. The software block configuration illustrated in FIG. 2 is especially focused on the poster creation unit 210 that executes an automatic poster creation function.

The poster creation condition designating unit 201 specifies poster creation conditions to the poster creation unit 210 in accordance with UI operation performed using the pointing device 107. In the present embodiment, a poster size, the number of those to be created, and a use category are specified as the poster creation conditions. Actual dimension values including a width value and a height value may be specified as the poster size. A paper size such as A1 or A2 may be specified instead. The use category indicates what kind of use the poster is intended for, for example, for restaurant use, for school-event announcement, for sales promotion, or the like.

The text designating unit 203 designates character information to be arranged on the poster in accordance with UI operation performed using the keyboard 106. The character information to be arranged on the poster means, for example, character strings that represent a title, time and date, a place, and the like. The text designating unit 203 outputs, to the skeleton acquisition unit 213 and a layout unit 217, each character information in an associated manner such that it is identifiable what kind of information the character information is, such as the title, the time and date, the place.

The image designating unit 202 designates a group of images to be arranged on the poster. The group of images is stored in the HDD 104. The group of images may be designated based on, for example, the structure of a file system including images as in a device or directory or the like, may be designated based on accompanying information of individual images such as the time and date of capturing, or may be designated based on attribute information. The image designating unit 202 outputs file paths to the designated images to an image acquisition unit 211.

The aimed impression designating unit 204 designates the aimed impression of the poster to be created. The aimed impression is an impression that the poster that will have been created should finally give. In the present embodiment, by performing UI operation using the pointing device 107, the user specifies, for each word that represents an impression, the degree of strength of an impression that the poster should give. A detailed explanation of an impression will be given later.

Based on the designated image data, the designated text data, the designated poster creation conditions, and the aimed impression, the poster creation unit 210 executes the automatic poster creation function.

The poster display unit 205 outputs a poster image(s) to be displayed on the display 105 in accordance with the acquired poster data. The poster image is, for example, bitmap data. The poster display unit 205 displays the poster image on the display 105.

When the poster creation application has been installed in the information processing apparatus 100, a start icon is displayed on the home screen (desktop) of an operating system (OS) running on the information processing apparatus 100. When the user operates the pointing device 107 to double-click the start icon displayed on the display 105, the program stored in the HDD 104 is loaded into the RAM 103 and is launched due to execution by the CPU 101.

Though not illustrated, the poster creation application may have an additional function of accepting an additional input(s) made by the user after the display of a creation result(s) by the poster display unit 205 so as to enable editing of the arrangement, a color(s), a shape(s), and/or the like of an image(s), a text(s), and a graphic(s), thereby changing the design to bring it closer to what is demanded by the user. If there is a print function of printing out the poster data stored in the HDD 104 by a printer under conditions specified by the poster creation condition designating unit 201, the user will be able to obtain a print output(s) of the created poster(s).

Example of Display Screen

Figure 5:
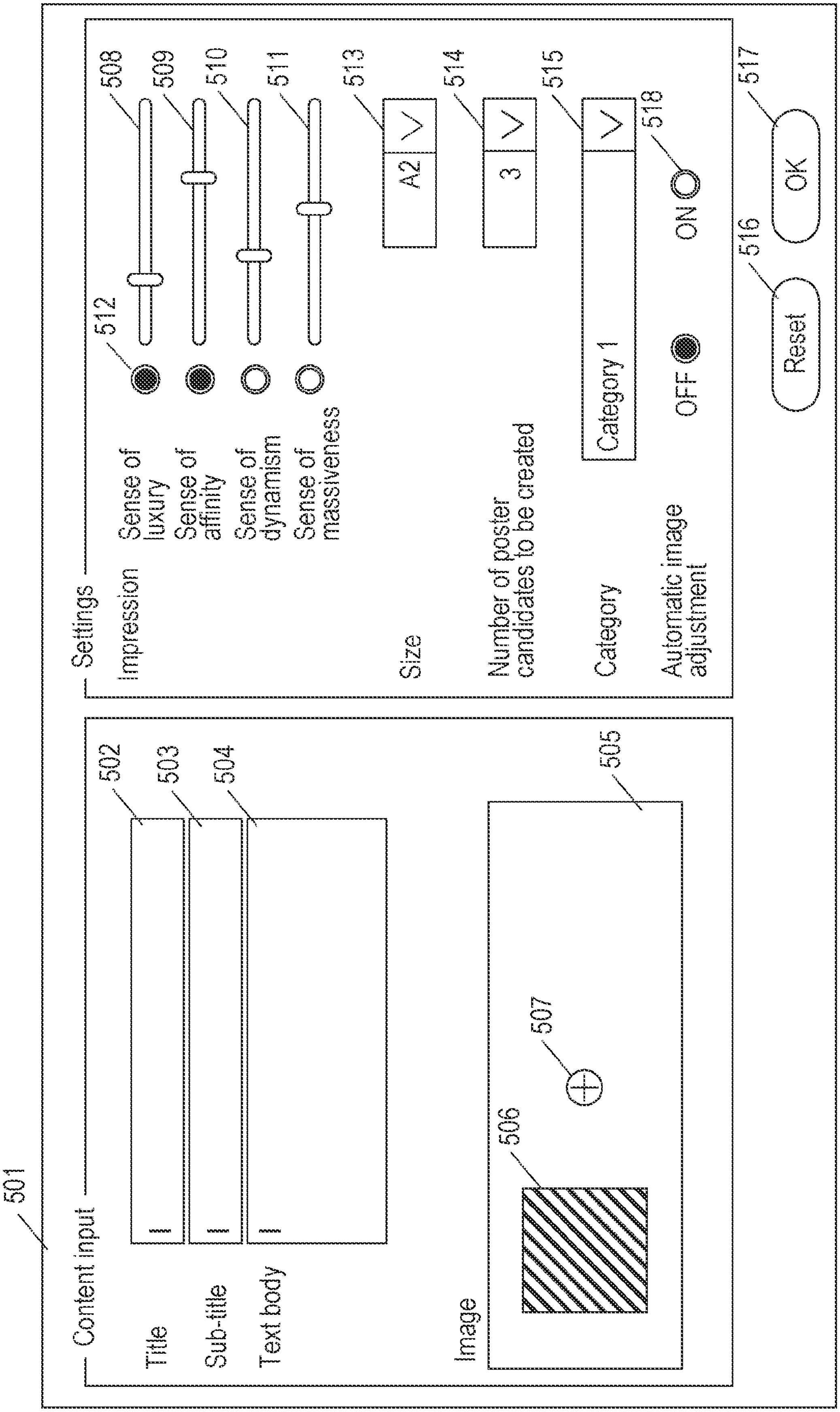
FIG. 5 is a diagram illustrating a display screen presented by the poster creation application.

FIG. 5 is a diagram illustrating an example of an app screen 501 presented by the poster creation application. The app screen 501 (a first screen) is a screen that is displayed on the display 105 and receives inputs of an aimed impression from the user when the application runs. The user sets poster creation conditions that will be described later, texts, and images via the app screen 501, and the poster creation condition designating unit 201, the image designating unit 202, and the text designating unit 203 acquire the content of settings from the user via this UI screen.

A title box 502, a sub-title box 503, and a text body box 504 accept designation of character information to be arranged on the poster. Though designation of three kinds of character information are accepted in the present embodiment, the scope of the present disclosure is not limited to this example. For example, designation of additional character information such as place and time and date may be accepted. Designation in all of these boxes is not indispensable. Some of the boxes may be left blank.

An image designation area 505 is an area to display an image(s) to be arranged on the poster. An image 506 is a thumbnail of the designated image. An "Add an image" button 507 is a button for adding an image to be arranged on the poster. When the "Add an image" button 507 is clicked by the user, the image designating unit 202 displays a dialog screen for selecting a file from among those stored in the HDD 104 and accepts an image-file selection made by the user. A thumbnail of the selected image is additionally displayed at the position 507 in the image designation area.

Impression sliders 508 to 511 are sliders for setting the aimed impression of the poster to be created. For example, the reference numeral 508 denotes a slider for setting the aimed level regarding a sense of luxury. With this slider, the user is able to set the aimed impression such that the poster that will have been created will give a higher level of a sense of luxury as the set position of this slider goes rightward and will give a lower level of a sense of luxury (less expensive, cheaper) as the set position of this slider goes leftward. If, for example, the user sets the impression slider 508 to a right-side position and the impression slider 511 to a left-side position, that is, if the set level of luxury is high and if the set level of massiveness is low, the poster that will have been created will have an elegant look. On the other hand, if the user sets the impression slider 511 to a right-side position while keeping the impression slider 508 at the right-side position, that is, if both the set level of luxury and the set level of massiveness are high, the poster that will have been created will have a gorgeous look. As described here, combining a plurality of impression sliders makes it possible to make a variety of impression settings different in orientation as to what kind of impression is aimed for, even for the same theme of impression such as a sense of luxury.

Radio buttons 512 are used for controlling ON/OFF settings of the respective items of aimed impression. FIG. 5 illustrates a state in which items "a sense of luxury" and "a sense of affinity" are ON and items "a sense of dynamism" and "a sense of massiveness" are OFF. If the user sets a certain radio button 512 OFF, the item of impression corresponding to this radio button is excluded from impression control. For example, a user who wants to create a poster that has a calm atmosphere with a low level of a sense of dynamism and demands nothing about the other items of impression is able to create such a poster focusing on low dynamism by setting the radio buttons 512 OFF, except for the one corresponding to "a sense of dynamism". This realizes control with a high degree of flexibility such as using all of the items of the aimed impression or using only some of them for creating the poster.

A size list box 513 is a list box for setting the size of the poster to be created. In response to a click operation performed by the user operating the pointing device 107, a list of available poster sizes is displayed, and the user is able to select a size from among them.

A number-of-those-created box 514 is a box in which the user is able to set the number of candidates for the poster to be created.

A category list box 515 is a list box in which the user is able to set the use category of the poster to be created.

A reset button 516 is a button for resetting each setting information on the app screen 501.

An automatic image adjustment radio button 518 is a radio button for setting whether to make an image adjustment automatically or not. If the automatic image adjustment radio button 518 is ON, the poster creation unit 210 is allowed to make an image adjustment automatically. Even if this radio button is ON, an image adjustment is not made in a case where it is determined that no image adjustment is needed at the poster creation unit 210. If the automatic image adjustment radio button 518 is OFF, the image adjustment processing is skipped at the poster creation unit 210.

When an OK button 517 is clicked by the user, the poster creation condition designating unit 201, the text designating unit 203, the image designating unit 202, and the aimed impression designating unit (aimed impression receiving unit) 204 output the content of settings on the app screen 501 to the poster creation unit 210. When acquiring the content of settings, the poster creation condition designating unit 201 acquires the size of the poster to be created from the size list box 513, the number of candidates for the poster to be created from the number-of-those-created box 514, and the use category of the poster to be created from the category list box 515. The text designating unit 203 acquires character information to be arranged on the poster from the title box 502, the sub-title box 503, and the text body box 504. The image designating unit 202 acquires a file path(s) for the image(s) to be arranged on the poster from the image designation area 505. The aimed impression designating unit 204 acquires the aimed impression of the poster to be created from the impression sliders 508 to 511 and the radio buttons 512. The poster creation condition designating unit 201, the text designating unit 203, the image designating unit 202, and the aimed impression designating unit 204 may edit the values set on the app screen 501. For example, the text designating unit 203 may remove an unnecessary blank space from the head or the tail of the inputted character information. The aimed impression designating unit 204 may perform shaping on the values having been set using the impression sliders 508 to 511. In the present embodiment, shaping to integer values from −2 to +2 is performed, wherein a state in which the slider has been set to the leftmost position corresponds to −2, and a state in which the slider has been set to the rightmost position corresponds to +2. The correspondences between the values and the levels of the impression are as follows: −2 corresponds to "low"; −1 corresponds to "somewhat low", 0 corresponds to "neutral", +1 corresponds to "somewhat high", and +2 corresponds to "high". The reason why the shaping to −2 to +2 is performed is to make it easier to perform distance calculation by matching in scale with estimated impression that will be described later. This is a non-limiting example. Normalization as in 0 to 1 may be performed.

Figure 6:
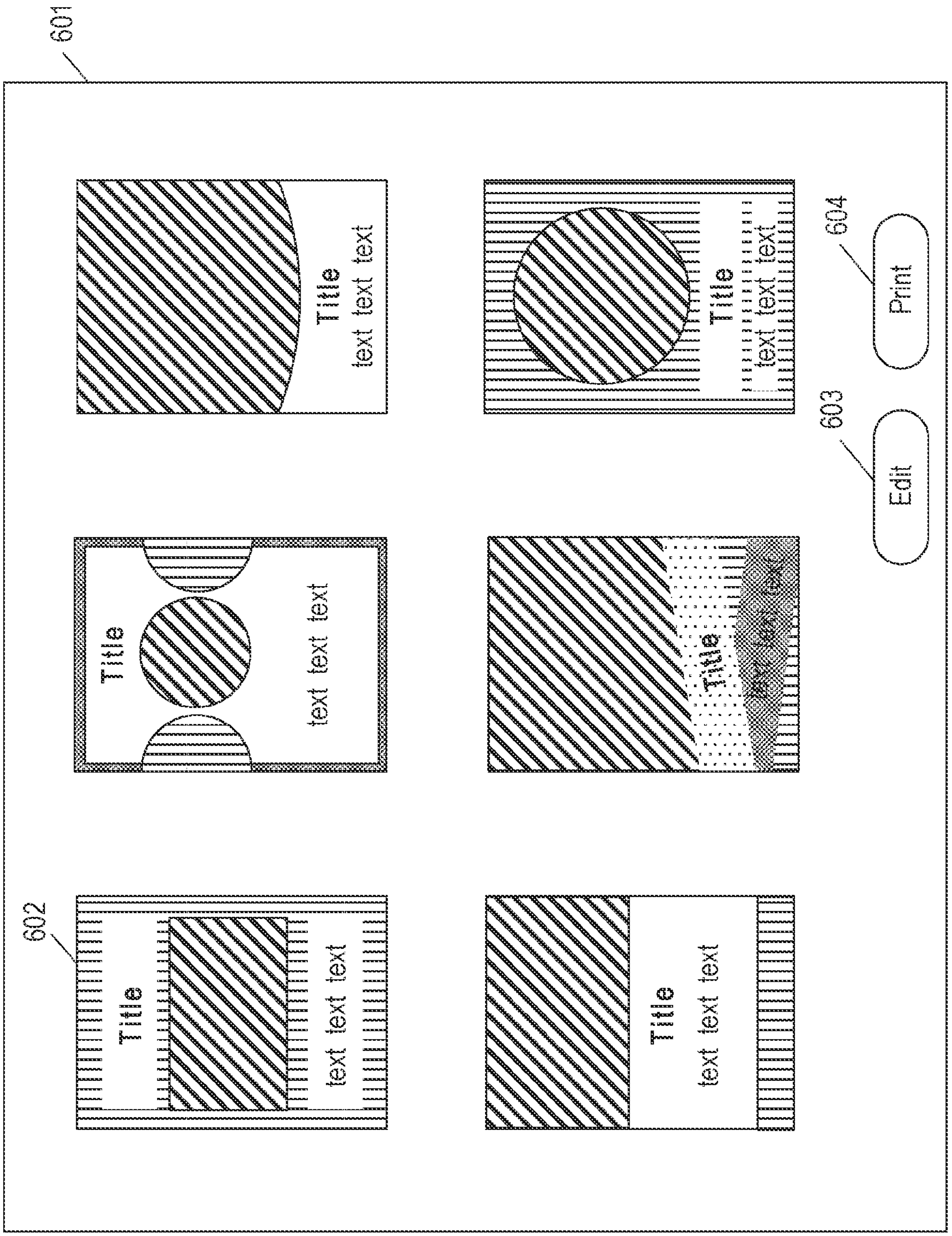
FIG. 6 is a diagram illustrating a display screen presented by the poster creation application.

FIG. 6 is a diagram illustrating an example of a poster preview screen for displaying poster images having been created by the poster display unit 205 on the display 105. Upon completion of poster creation after the clicking of the OK button 517 on the app screen 501, the screen displayed on the display 105 switches to a poster preview screen 601.

Poster images 602 illustrated therein are the poster images outputted by the poster display unit 205. Since the poster creation unit 210 creates a plurality of posters whose number corresponds to the number designated by the poster creation condition designating unit 201, the poster images 602 are also displayed in a layout like an album of the created posters. By operating the pointing device 107 to click a poster, the user is able to put this poster into a selected state.

Clicking an edit button 603 enables the user to edit the selected poster by using a UI that provides an edit function that is not illustrated therein.

Clicking a print button 604 enables the user to obtain a print output of the selected poster by using a control UI of a printer that is not illustrated therein.

Poster Impression Quantification

A method for quantifying poster impression, which is necessary for poster creation processing that will be described later, will now be described. In poster impression quantification, impression that a human gets from various posters is quantified.

At the same time, a corresponding relationship between a poster image and a poster impression is derived. Deriving this relationship makes it possible to estimate, from a poster image, the impression of a poster to be created. Once the impression is estimated, it becomes possible to control the impression of the poster by performing poster retouching or possible to search for a poster that will give a certain aimed impression. Processing for quantifying the impression of a poster is executed by, for example, in an information processing apparatus, running an impression learning application for learning the impression of a poster in advance, prior to executing poster creation processing.

Figure 22:
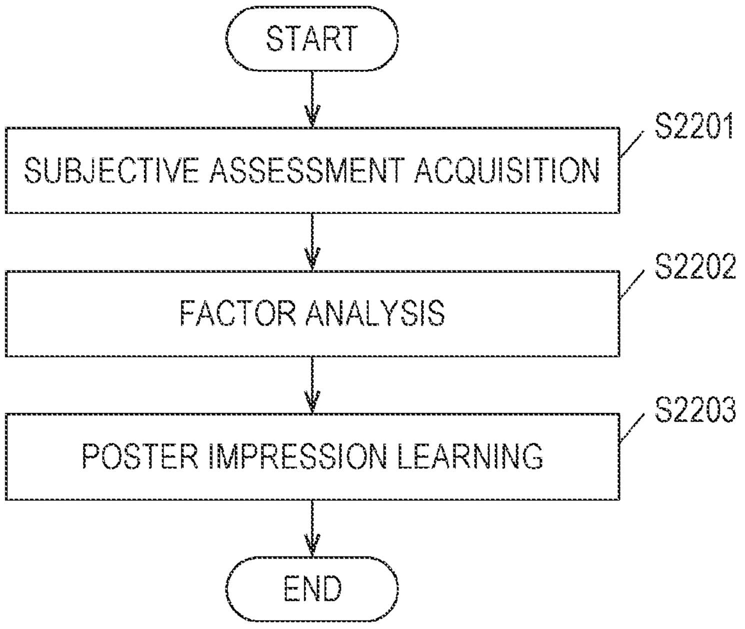
FIG. 22 is a flowchart illustrating processing for quantifying the impression of a poster.

FIG. 22 is a flowchart illustrating processing for quantifying the impression of a poster. The flowchart illustrated in FIG. 22 is implemented by, for example, reading a program stored in the HDD 104 out into the RAM 103 and running the program by the CPU 101. With reference to FIG. 22, processing for quantifying the impression of a poster will now be described. The reference alphabet "S" in the description of each processing below denotes a step in the flowchart (the same applies hereinafter in this specification).

Figure 7:
FIG. 7 is a diagram illustrating an example of subjective assessment of a poster.

In a step S2201, the CPU 101 performs subjective assessment of an impression of a poster. FIG. 7 is a diagram for explaining a method for subjective assessment of an impression of a poster. A subjective assessment acquisition unit presents a poster to a person who is an assessment participant, and acquires, from the person, subjective assessment of an impression that s/he gets from the poster. In this process, a measurement method known as a sematic differential (SD) method or a Likert scale method can be used. FIG. 7 illustrates an example of a questionnaire using the SD method. Pairs of adjectives that express impression are presented to a plurality of persons who performs assessment, and scoring is performed as to how the poster that is under the questionnaire looks regarding the pairs of adjectives. The subjective assessment acquisition unit acquires the results of subjective assessment from a plurality of persons who are assessment participants for a plurality of posters and thereafter calculates an average value of answers for each pair of adjectives, thereby obtaining a representative numerical value for the pair of adjectives. An alternative method other than the SD method may be used for subjective assessment of the impression. It is sufficient as long as words describing impression and scores for the words can be determined.

In a step S2202, the CPU 101 performs a factor analysis of the results of subjective assessment acquired by the subjective assessment acquisition unit. If the results of subjective assessment are handled as they are, the number of pairs of adjectives will be the number of dimensions, resulting in complex control. Therefore, it is desirable to reduce this number to an efficient number of dimensions by using an analysis technique such as a principal component analysis or a factor analysis. Performing this reduction makes it possible to define a multidimensional impression space whose indices are based on impression. In the present embodiment, it is assumed that a dimensional reduction to four factors is performed using a factor analysis. As a matter of course, this number varies depending on pairs of adjectives selected for subjective assessment and the method of a factor analysis. It is further assumed that the output of the factor analysis has been standardized. That is, each factor is scaled to have an average of 0 and a variance of 1 in the poster used for the analysis. This makes it possible to obtain correspondences between −2, −1, 0, +1, and +2 of the impression designated by the aimed impression designating unit 204 and −2a, −1a, the average, +1a, and +2a in each impression as it is, thereby making it easier to calculate a distance between an aimed impression and an estimated impression, which will be described later. In the present embodiment, a sense of luxury, a sense of affinity, a sense of dynamism, and a sense of massiveness that are illustrated in FIG. 5 are taken as the four factors. However, they are names given for the convenience of conveying impression to the user via a user interface, and each factor is constructed such that plural pairs of adjectives have influences on one another.

In a step S2203, the CPU 101 associates a poster image with an impression. Though it is possible to quantify the impression of the poster for which subjective assessment has been performed using the method described above, there is a need to estimate an impression without subjective assessment also for a poster that is to be created from now. The association between a poster image and an impression can be realized by learning a model for estimating an impression from a poster image by using, for example, a deep learning method based on a convolution neural network (CNN), a machine learning method employing a decision tree, or the like. In the present embodiment, an impression learning unit performs supervised deep learning using CNN while taking a poster image as its input and outputting the four factors. That is, a deep learning model is created by learning the poster images having been subjected to the subjective assessment and the corresponding impression as correct answers, and then an impression is estimated by inputting an unknown poster image into the learned model.

The deep learning model created as described above is stored into, for example, the HDD 104, and an impression estimation unit 218 loads the deep learning model stored in the HDD 104 into the RAM 103 and executes it.

In impression estimation processing, template data or poster data is put into the form of an image, and the deep learning model having been loaded into the RAM 103 is run by the CPU 101 or the GPU 109, thereby estimating the impression of the poster. Though a deep learning method is used in the present embodiment, this is a non-limiting example. For example, in a case where a machine learning method such as a decision tree is used, a feature amount such as an average luminance value or an edge amount of a poster image may be extracted by performing image analysis, and a machine learning model for estimating an impression may be created based on the feature amount.

Flow of Processing

Figure 8:
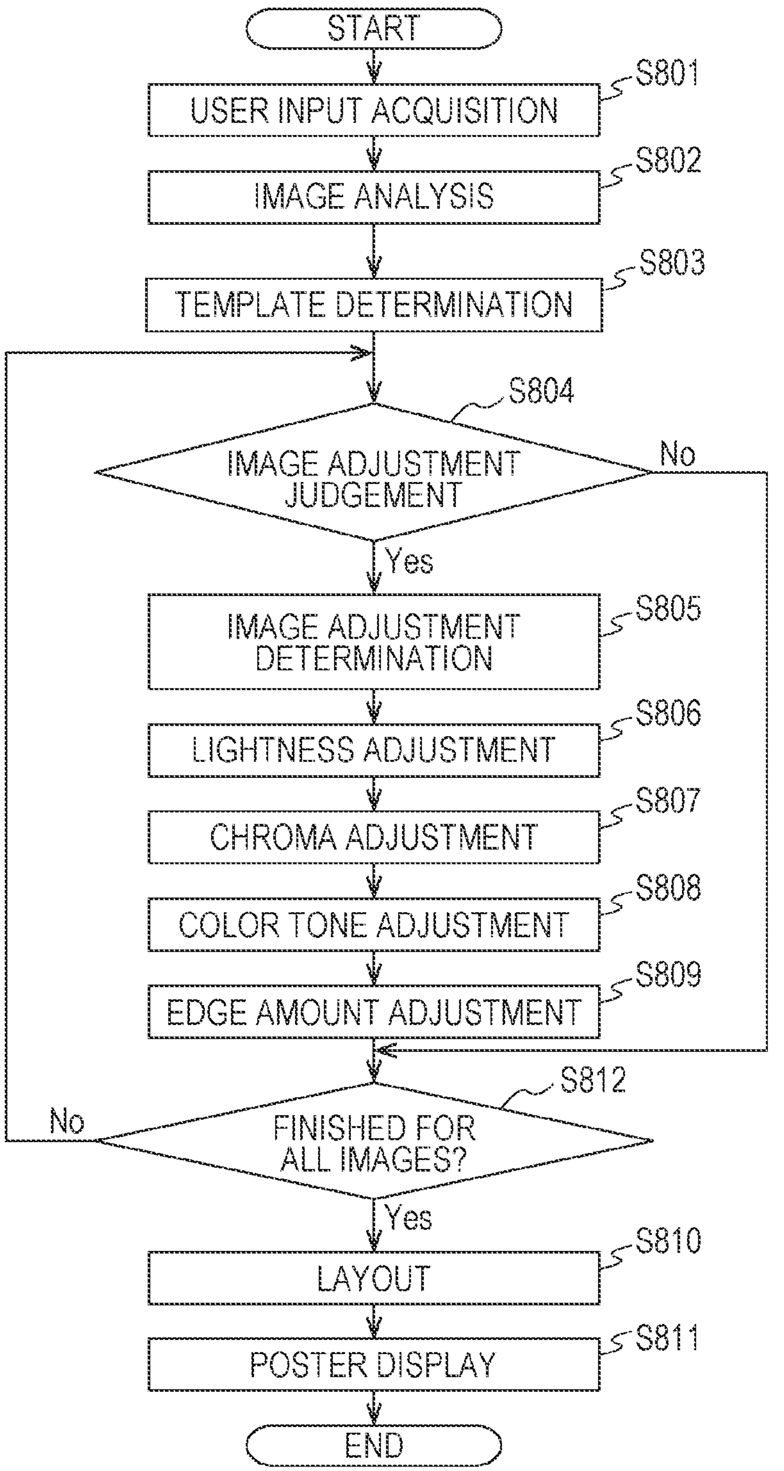
FIG. 8 is a flowchart illustrating poster creation processing according to a first embodiment.

FIG. 8 is a flowchart illustrating processing of the poster creation unit 210 of the poster creation application according to the present embodiment. In related art, a template is selected based on input image data, and an image adjustment is made to make it suited for the selected template. However, with this processing, a poster that is demanded by the user cannot always be created. This is because input image data does not necessarily represent the impression of the poster that is demanded by the user. When an image selection is made for creating a poster, in many instances, a priority is given to an image that visually contains a captured subject related to a point that the creator of the poster wants to appeal to customers. Moreover, if the user is an ordinary user who does not have design expertise, it is difficult for the user to adjust an input image into a user-demanded image. Furthermore, it could happen that the selected template does not match with the impression of the poster that is demanded by the user. Also in this case, if the user is an ordinary user who does not have design expertise, it is difficult for the user to edit the poster to bring its impression close to a user-demanded impression after the rendering of the image and the template.

In the present embodiment, through the processing illustrated in FIG. 8, an aimed impression, which is an impression that the user wants to impart to the poster to be created, is inputted, and it is possible to perform automatic control on an image adjustment and perform automatic template selection, in accordance with the aimed impression. Consequently, it is possible to create a poster that gives a user-demanded impression automatically. The flowchart illustrated in FIG. 8 is implemented by, for example, reading a program stored in the HDD 104 out into the RAM 103 and running the program by the CPU 101. In the description of FIG. 8, it is assumed that the components illustrated in FIG. 2, as which the CPU 101 functions by running the poster creation application described above, perform processing. With reference to FIG. 8, poster creation processing will now be described.

In a step S801, the CPU 101 acquires a user input. The user input includes inputting poster creation conditions, inputting images, inputting characters, inputting an aimed impression. Specifically, the inputting of poster creation conditions is performed by acquiring the poster creation conditions designated by the poster creation condition designating unit 201. The inputting of images is performed by acquiring the group of images designated by the image designating unit 202 as image data from the HDD 104. The characters that are inputted are acquired from the text data designated by the text designating unit 203. The inputting of an aimed impression is performed by acquiring the aimed impression designated by the aimed impression designating unit 204. The CPU 101 outputs the acquired image data. Examples of the images stored in the HDD 104 are a still image, and a frame image clipped out of a moving image. The still image and the frame image are acquired from an image-capturing device such as a digital camera, a smartphone, etc. The image-capturing device may be included in the information processing apparatus 100, or in an external device. If the image-capturing device is an external image-capturing device, the images are acquired via the data communication unit 108. As another example, the still image may be an illustration image created using image editing software or a CG image created using CG production software. The still image and the clipped-out image may be images acquired from a network or a server via the data communication unit 108. An example of the image acquired from a network or a server is a social networking service image (hereinafter referred to as "SNS" image"). The program run by the CPU 101 performs, for each image, analysis of data affixed to the image and determines a storage source. The acquisition source of an SNS image may be managed in an application by performing image acquisition from SNS via the application. The images are not limited to those described above, and may be any other kind of image. It is assumed that various settings made via the UI screen of the app screen 501 have completed at the point in time at which the step S801 is executed. That is, it is assumed that the poster creation condition designating unit 201, the text designating unit 203, the image designating unit 202, and the aimed impression designating unit 204 have acquired the settings from the app screen 501. Specifically, in S801, the image acquisition unit 211 reads the image files designated by the image designating unit 202 out of the HDD 104 into the RAM 103.

In the step S802, the CPU 101 performs analysis processing on the image data acquired in the step S801 to acquire an image feature amount. Specifically, metadata information stored in the image, color information about colors such as lightness, chroma, hue, and the number of colors, and an edge amount, and shape information about a shape such as a straight-line factor and a curve factor are acquired. An example of a method for calculating lightness and chroma is to convert image data into an LCH color space, thereby calculating lightness L, chroma C, and hue H.

A statistical value such as an average value, a variance value, etc. of the image as a whole may be used for the calculated lightness, chroma, and hue. A histogram shape such as peakedness and/or skewness may be used. As an example of a method for calculating the number of colors, when the image data is RGB 8-bit data, the number of colors that exist in an image in 16,581,375 colors may be measured. The number of colors may be measured for each color type as in a Munsell color chart. Moreover, in the step S802, as one of kinds of the image feature amount, the CPU may calculate an estimated impression. With regard to a method as to how to estimate the impression, the poster impression quantification method described earlier is adapted to the image so as to perform calculation. After calculating the image feature amount, the calculation result is outputted to the HDD 104 or the RAM 103 in association with the image data.

In a step S803, the CPU 101 determines a template to be used for poster creation. Specifically, a template selection, in which templates that meet the conditions designated by the poster creation condition designating unit 201, the text designating unit 203, the image designating unit 202, and the aimed impression designating unit 204 are selected, is performed. It is assumed that each one template is described in one file and is stored in the HDD 104. The CPU 101 reads template files one after another out of the HDD 104 into the RAM 103, retains templates that meet the set conditions on the RAM 103, and deletes templates that do not meet the set conditions from the RAM 103. In the present embodiment, the term "template" means a skeleton for which color arrangement and fonts have already been set. A template has information about an estimated impression that has been calculated in advance by using the impression estimation method described above. In the step S803, for the template having been read into the RAM 103, first, the CPU 101 determines whether the poster size in the poster creation conditions having been acquired in the step S801 agrees with the template size or not. Though matching in size is checked in this example, matching in aspect ratio only may be checked. In this case, the CPU 101 enlarges or reduces the coordinate system of the read template, and acquires templates the enlarged or reduced size of which agrees with the poster size designated by the poster creation condition designating unit 201. Next, the CPU 101 determines whether the category of the template agrees with the use category designated by the poster creation condition designating unit 201 or not. For a template that is to be used for a specific use only, its use category is described in its template file so that this template will not be acquired except for a case where this use category is selected. In a case where a template is designed as specific-purpose one, with a particular use in mind, for example, when the template contains a graphic of sports articles that will make the person who sees the poster think of a school, this makes it possible to prevent such a specific-purpose template from being used for a wrong category. Next, the CPU 101 determines whether the number of image objects in the read template agrees with the number of images acquired by the image designating unit 202 or not. Finally, the CPU 101 determines whether the text object in the read template agrees with the character information designated by the text designating unit 203 or not. More specifically, it is determined whether the types of the character information designated by the text designating unit 203 are included in the template or not. For example, suppose that character strings are designated in the title box 502 and the text body box 504 on the app screen 501, and a blank is designated in the sub-title box 503. In this case, a search is executed on all text objects included in the template, and the template is determined as matching one if both a text object for which "title" is set and a text object for which "text body" is set as the types of character information of metadata are found, and the template is determined as non-matching one in other cases. As described above, the CPU 101 retains, on the RAM 103, templates for which all of the template size, the number of image objects, and the types of text objects are determined to match with the set conditions. In the present embodiment, the CPU 101 performs the determination for all of the template files stored in the HDD 104; however, this is a non-limiting example. For example, the poster creation application may pre-store a database that associates file paths of template files with search conditions (the skeleton size, the number of image objects, and the types of text objects) in the HDD 104. In this case, the CPU 101 is able to perform template-file acquisition at a high speed by reading not all but only matching template files found as a result of executing a search through the database out of the HDD 104 into the RAM 103. Moreover, screening is performed to reduce the templates to those matching with the aimed impression having been acquired in the step S801. An example of a method for screening is to perform determination based on the difference of the poster impression in the template from the aimed impression. In order to simplify the explanation, it is assumed that the impression is scaled on two axes, a sense of affinity and a sense of dynamism. Each axis has a numerical range from −3.0 to 3.0, and it is assumed that a different impression is recognized when there is a difference of 1.0 or greater by normalization. For example, suppose that the aimed impression is at (a sense of affinity, a sense of dynamism)=(1.0, 2.0), the template impression of a template A is at (a sense of affinity, a sense of dynamism)=(−1.0, −1.0), and the template impression of a template B is at (a sense of affinity, a sense of dynamism)=(1.0, 1.5). When this numerical example is given, the difference between the aimed impression and the template A is (a sense of affinity, a sense of dynamism)=(2.0, 3.0), and the difference between the aimed impression and the template B is (a sense of affinity, a sense of dynamism)=(0.0, 0.5). In this case, the difference of the template B from the aimed impression is less than that of the template A in both of the two axes. For this reason, the template B is chosen. This comparison processing is performed for all of the templates having been subjected to screening, and the template that is closest to the aimed impression is determined. In the above example, the difference values on the two axes are taken as the determination criteria; however, the determination may be made based on a Euclidean distance. Using a Euclidean distance makes it possible to better reflect a difference in impression on the two axes and calculate the difference from the aimed impression more accurately. In the example described above, the impression is scaled on the two axes; however, the number of axes may be increased. Also in this case, it is possible to perform determination based on the difference from the aimed impression by calculating a Euclidean distance. In the step S803, the CPU 101 determines the number of templates in accordance with the number of poster candidates to be created, which has been designated by the poster creation condition designating unit 201. After determining the template(s), the CPU 101 outputs the acquire template. The aimed impression varies as the following factors in the template vary: an image layout position(s), a text layout position(s), a graphic layout position(s), a character font(s), color arrangement, graphics, and the like.

Figure 10:
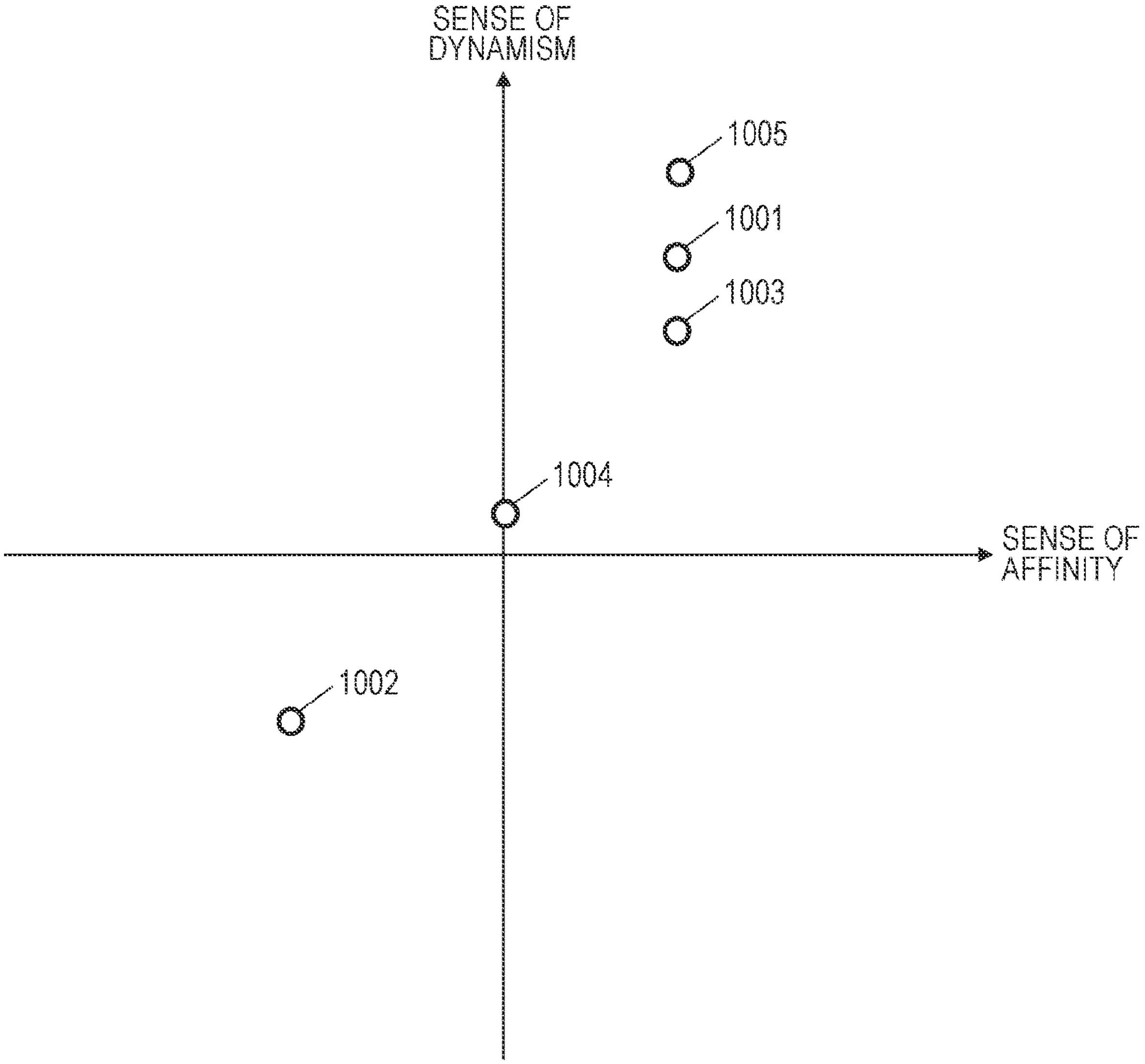
FIG. 10 is a schematic diagram illustrating an image adjustment according to the second embodiment.

In a step S804, the CPU 101 determines whether it is necessary to make an image adjustment or not. Specifically, this judgment is made based on the aimed impression acquired in the step S801, the image impression included in the image feature amount outputted in the step S802, and the template impression included in the template determined in the step S803. As an example of a method for this judgment, the distance of an average value of the template impression and an average value of the image impression from the aimed impression is calculated. In order to simplify the explanation, it is assumed that the impression is scaled on two axes, a sense of affinity and a sense of dynamism. FIG. 10 is a schematic diagram illustrating the determination as to whether it is necessary to make an image adjustment or not. FIG. 10 depicts a two-dimensional space the horizontal axis of which represents a sense of affinity and the vertical axis of which represents a sense of dynamism. Each axis has a numerical range from −3.0 to 3.0, and it is assumed that a different impression is recognized when there is a difference of 1.0 or greater by normalization. For example, suppose that an aimed impression 1001 is at (a sense of affinity, a sense of dynamism)=(1.0, 2.0), an image impression 1002 is at (a sense of affinity, a sense of dynamism)=(−1.0, −1.0), and a template impression 1003 is at (a sense of affinity, a sense of dynamism)=(1.0, 1.5). In this case, a synthesized impression 1004 that is a synthesis of the image impression and the template impression is at (a sense of affinity, a sense of dynamism)=(0.0, 0.25). When this value of synthesis is given, the difference from the aimed impression 1001 is (a sense of affinity, a sense of dynamism)=(1.0, 1.25). Since the difference is not less than 2.0 in terms of Manhattan distance, there is a possibility that the impression of the created poster might be recognized as being different from the user-specified impression. Therefore, in the step S804, the CPU 101 determines that it is necessary to make an image adjustment. If the difference from the aimed impression is less than 1.0 on both of the two axes, in the step S804, the CPU 101 determines that it is unnecessary to make an image adjustment. Next, the CPU 101 calculates an after-adjustment aimed image impression 1005. In order to bring the image-template-synthesized impression to the aimed impression, the after-adjustment aimed image impression 1005 should be at (a sense of affinity, a sense of dynamism)=(1.0, 2.5).

In the above example, the difference of 2.0 or greater in terms of Manhattan distance is taken as the determination criterion; however, the determination may be made based on a Euclidean distance. Using a Euclidean distance makes it possible to better reflect a difference in impression on the two axes and calculate the difference from the aimed impression more accurately. In the example described above, the impression is scaled on the two axes; however, the number of axes may be increased. Also in this case, it is possible to perform determination based on the difference from the aimed impression by calculating a Euclidean distance. If the automatic image adjustment radio button 518 is OFF, irrespective of the result of the above determination, the CPU determines that it is unnecessary to make an image adjustment. If it is determined that an image adjustment is necessary, the process proceeds to a step S805. If it is determined that an image adjustment is unnecessary, the process proceeds to a step S806.

In the above example, the image impression and the template impression are simply averaged; however, the image impression and the template impression may be weighted. This is because, depending on the size of an area(s) where an image(s) is placed, whether the image impression is dominant or the template impression is dominant varies. Let Mt be the entire template area size. Let It be the template impression. Let Mp the area size of the image arranged in the template. Let Ip be the image impression. Given these definitions, a summed impression Ig can be calculated using the following formula.

$$Ig = \left(\frac{Mt - Mp}{Mt} * It + \frac{Mp}{Mt} * Ig\right) \quad (1)$$

In this way, it is possible to calculate the synthesized impression while taking into consideration the size of the area where the image is placed. Consequently, it is possible to enhance the precision of the impression of the poster after the image and the template are synthesized. Next, a case where plural pieces of user input image data are inputted in the step S801 will now be described. In a case where there is a plurality of input images, an image impression is calculated for each of these images and is synthesized with the template impression, and an average value thereof is taken as the synthesized impression. In a case of area-size-based calculation, weighted calculation is performed while assigning a weight dependent on an area ratio of each of these images. The after-adjustment aimed image impression may be the same for all of the images. Alternatively, settings may be made for each of these images such that the result of average calculation or area-ratio-based weighted calculation becomes the after-adjustment aimed image impression.

In a step S805, the CPU 101 determines image processing to be applied to the image data by using the image feature amount of the image data and by using the after-adjustment aimed image impression. The image processing to be applied to the image data is determined based on the difference between the image feature amount derived from the after-adjustment aimed image impression and the image feature amount having been analyzed in the step S802. FIG. 4 illustrates a table for deriving the image feature amount from the aimed impression. The table for deriving the feature amount is created by performing impression estimation on many images in advance and statistically analyzing the feature amount corresponding to each impression. In FIG. 4, the table header column represents items of impression, the table header row represents items of image feature amount, and image feature amount is shown for each item of aimed impression. For example, the table shows that, in order to impart a sense of affinity, as the image feature amount, chroma should be moderate, the number of colors should be medium, and edge amount should be small. The table shows that, in order to impart a sense of dynamism, chroma should be high, hue should be from red to orange, the number of colors should be many, and edge amount should be large. The table shows that, in order to impart a sense of massiveness, chroma and lightness should be low. There exists some kind of impression such as a sense of luxury that cannot be controlled in terms of image feature amount. Adjustment processing is not performed for such a kind of impression that cannot be controlled in terms of image feature amount. For example, if a sense of affinity is selected in the aimed impression, adjustment processing for bringing the chroma of the image data to a medium level is performed. As will be described below, in steps S806 to S809, the CPU 101 performs the image processing having been determined in the step S805.

Figure 23:
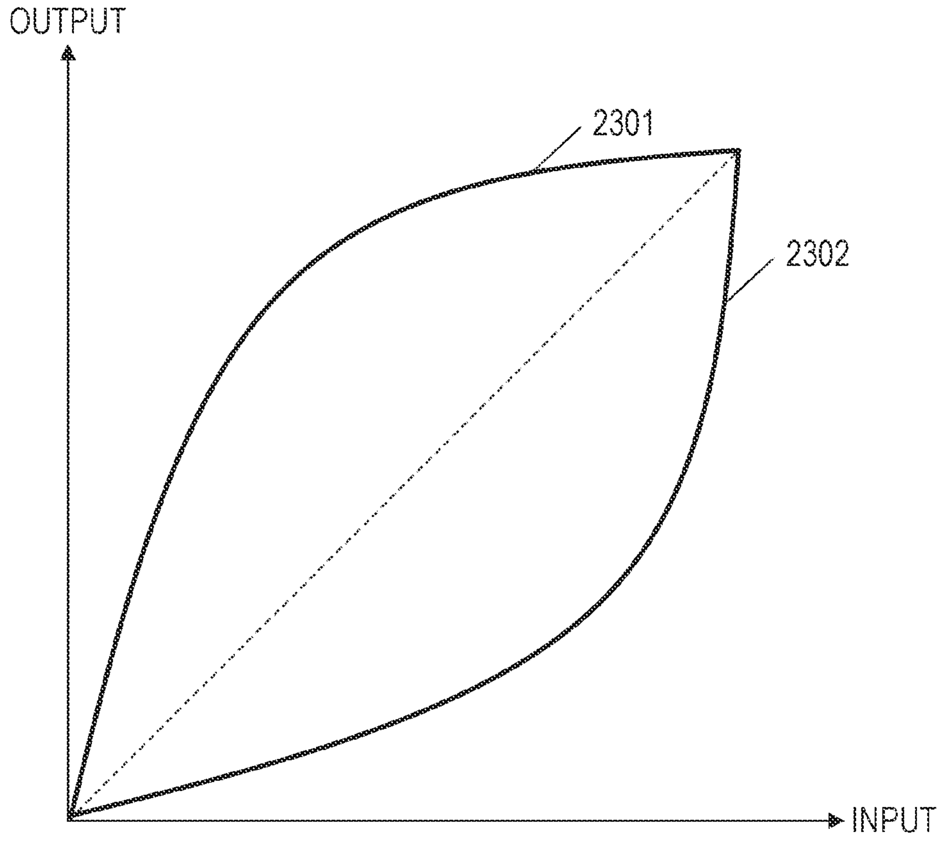
FIG. 23 is a diagram illustrating an example of a gamma table for making a gamma adjustment.

In a step S806, the CPU 101 performs lightness adjustment processing if it is determined in the step S805 that lightness needs to be adjusted. Specifically, an example of the processing for adjusting the lightness is gamma processing. FIG. 23 is a schematic diagram illustrating a gamma curve used when performing gamma processing. The horizontal axis represents input values, and the vertical axis represents output values. If the image data is RGB data, conversion into an LCH color space is performed using a known technique, and gamma processing is applied to the lightness L. When gamma processing is performed using a concave-down gamma curve 2301 illustrated in FIG. 23, the lightness L becomes higher. When gamma processing is performed using a concave-up gamma curve 2302 illustrated in FIG. 23, the lightness L becomes lower. After the gamma processing, inverse conversion from the LCH color space to the RGB data is performed using a known technique. It is possible to adjust the lightness in this way by changing the shape of the gamma curve.

In a step S807, the CPU 101 performs chroma adjustment processing if it is determined in the step S805 that chroma needs to be adjusted. Specifically, an example of the processing for adjusting the chroma is gamma processing described above. If the image data is RGB data, conversion into an LCH color space is performed using a known technique, and gamma processing is applied to the chroma C. When gamma processing is performed using the concave-down gamma curve 2301 illustrated in FIG. 23, the chroma C becomes higher. When gamma processing is performed using the concave-up gamma curve 2302 illustrated in FIG. 23, the chroma C becomes lower.

After the gamma processing, inverse conversion from the LCH color space to the RGB data is performed using a known technique. It is possible to adjust the chroma in this way by changing the shape of the gamma curve.

In a step S808, the CPU 101 performs color tone adjustment processing if it is determined in the step S805 that color tone needs to be adjusted. As processing for making a color tone adjustment, there is a method of adjusting the hue H in an LCH color space; however, with this method, it is impossible to add a color in the neighborhood of a white point. Moreover, changing the hue simply will cause a feeling of strangeness because the color of the subject in the image will change. Therefore, as a preferred example in the present embodiment, color filter processing will now be described. It is possible to adjust color tone by superimposing a color image of colors which the user wants to adjust on image data. By performing this processing, a color in the neighborhood of a white point can also be changed, and the processed image will look similar to an image obtained by taking a photo under color-filter light; therefore, even when the color of the subject changes, it will not cause a feeling of strangeness so much. When color filter processing is performed, there is a possibility that the contrast of image data might decrease; therefore, after the color filter processing, contrast recovery processing is also performed. By this means, it is possible to adjust the color tone while keeping the contrast.

In a step S809, the CPU 101 performs edge amount adjustment processing if it is determined in the step S805 that an edge amount needs to be adjusted. Examples of the edge amount adjustment processing are sharpness filter processing and blurring filter processing. It is possible to increase an edge amount by applying a sharpness filter to the image. It is possible to decrease an edge amount by applying a blurring filter to the image.

In the steps S804 to S809, as described above, image adjustment processing for bringing the image feature amount of the image data closer to the aimed impression is performed. If plural images have been inputted in the step S801, the steps S804 to S809 are performed repeatedly plural times the number of which corresponds to the number of the input images. In a step S812, it is determined whether the processing has finished for all of the images or not. If it is determined that the processing has finished for all of the images, the process proceeds to a step S810. If plural templates have been determined in the step S803, the steps S804 to S809 are performed repeatedly plural times the number of which corresponds to the number of the templates. In the above example, the processing is performed in the order of lightness adjustment, chroma adjustment, color tone adjustment, and edge amount adjustment. However, the scope of the present disclosure is not limited thereto. The processing may be performed in any order.

In the step S810, the CPU 101 creates poster data for the template having been determined in the step S803. When the poster data is created, the text data having been acquired in the step S801, and either the image data having been acquired in the step S801 or the after-adjustment image data having been adjusted in the step S805 are laid out.

In a step S811, the CPU 101 outputs the poster data having been created in the step S810 to the display 105. That is, the preview screen 601 illustrated in FIG. 6 is displayed.

In the processing described above, each of the impression estimation and the adjustment processing is performed once for the image; however, each of them may be performed more than once. In this case, the type and intensity of adjustment processing are controlled such that, in FIG. 10, the average impression of the after-adjustment image impression and the template impression falls within a circle having its center at the aimed impression 1001 and having a radius of 1, and, in addition, such that an amount of change in pixel values caused due to the image adjustment is minimized. The amount of change in pixel values is calculated by acquiring a pixel-value difference by comparing the image before the adjustment and the image after the adjustment. For example, the maximum value of the pixel-value difference between the image before the adjustment and the image after the adjustment may be adopted. Alternatively, a sum value of the pixel-value difference between the image before the adjustment and the image after the adjustment, or an average value thereof, may be adopted. A value corresponding to the magnitude the pixel-value difference between the image before the adjustment and the image after the adjustment is taken as the amount of change. Instead of using the after-adjustment image, the amount of change may be calculated in advance for the type and intensity of adjustment processing. Every type of adjustment processing with every intensity is performed for a predetermined image for evaluation, and then the above-described pixel-value difference between the image before the adjustment and the image after the adjustment is calculated, thereby creating an amount-of-change calculation table. Looking up this amount-of-change table makes it possible to calculate an amount of change at a high speed. By this means, it is possible to automatically create a poster that gives an impression matching with the aimed impression inputted by the user while suppressing issues caused due to an image adjustment.

By performing the processing described above, it is possible to determine a template matching with the aimed impression inputted by the user and perform automatic control on image adjustment. Consequently, it is possible to create a poster that gives a user-demanded impression automatically.

Modification Examples of UI According to First Embodiment

In the first embodiment, the aimed impression is set using the impression setting slider bars 508 to 511 of the app screen 501. However, the method for setting the aimed impression is not limited to the foregoing example.

FIGS. 21A to 21D are diagrams illustrating examples of a UI for setting an aimed impression. FIG. 21A illustrates an example of setting an aimed impression using a UI on a radar chart. By operating a handle 2101 on the radar chart, the user is able to set an aimed impression on each axis. The aimed impression designating unit 204 acquires the aimed impression such that a value of −2 is acquired when the handle 2101 is located at the center of the UI and such that a value of +2 is acquired when at the outermost point thereof. In FIG. 21A, the aimed impression has a value of a sense of luxury of +0.8, a value of a sense of affinity of +1.1, a value of a sense of dynamism of −0.1, and a value of a sense of massiveness of −0.7. As described here, the aimed impression may be set with a decimal. The radar chart illustrated in FIG. 21B shows an example in which a part of the items of aimed impression is OFF. For example, by double-clicking the handle 2101 using the pointing device 107, the user is able to set, into OFF, the aimed impression on the axis corresponding to this handle. By clicking the axis 1602 on the radar chart using the pointing device 107, the user is able to set the disabled item of the aimed impression back into ON. In FIG. 21B, a sense of dynamism is OFF, and, except for this item of impression, the settings of the aimed impression illustrated therein are the same as those of FIG. 21A.

FIG. 21C illustrates an example of image-based setting of an aimed impression, instead of word-based setting. Poster images 2104 to 2107, in each of which the value of any one of the items of impression is large, are arranged in a sample poster display area 2103. A checkbox 2108 is displayed on each of these poster images. The user is able to choose one, or more, that the user thinks is close to the poster that the user wants to create, by clicking it using the pointing device 107 to turn its checkbox 2108 ON. The aimed impression designating unit 204 determines an aimed impression by looking up the impression corresponding to the poster image that is in a chosen state. FIG. 21D is a table showing impressions corresponding to the poster images 2104 to 2107 illustrated in FIG. 21C and a final aimed impression. For example, suppose that the poster images 2104 and 2107 are in a chosen state as illustrated in FIG. 21C. In this case, the aimed impression designating unit 204 determines, as the aimed impression, an impression 2113 that is a synthesis of respective impressions 2109 and 2112 of them. In this example, the aimed impression is determined by adopting the greater (greatest) absolute value among the respective values of impression corresponding to the chosen poster images. Though an example of presenting poster images each having the maximum value of its item of impression is described above, the scope of the present disclosure is not limited to this example. A poster image(s) having a plurality of large impression item values may be used. A plurality of poster images the number of which is greater than the number of items of impression may be presented. With this modification example, the user is able to designate the aimed impression intuitively while seeing actual poster images, instead of word-based designation.

Second Embodiment

In the first embodiment described above, impression estimation is performed individually for the image data and for the template. Then, the impression after synthesizing the image and the template is calculated by summing up the values of the estimated impression having been calculated individually. In this case, it could happen that the calculated value is different from the value of impression of a poster after synthesizing the image, the template, and the text. This is because, an impression of a poster as a whole is determined by a complex web of all factors including an image(s), layout and color arrangement and a font(s) in a template, and a text(s). For example, if colors included in the image are different from colors included in the template respectively, the number of colors increase, resulting in a high level of a sense of dynamism. By contrast, if there are many identical colors, the number of colors does not increase, resulting in a low level of a sense of dynamism. If the title is near the bottom, a sense of massiveness increases. However, if the title contains many Japanese hiragaga characters, it reduces massiveness. Even when an image has a massive look, if the template has an inclined photo layout or a round balloon, a sense of dynamism and a sense of intimacy increase, resulting in suppressed massiveness. As described here, in order to estimate the impression of a poster image after automatic creation with high precision, it is better to perform estimation after synthesizing the image, the template, and the text. Therefore, if a method of performing individual estimation for the image, the template, and the text and summing up the results is used, there is a possibility that a poster that gives a user-demanded impression cannot be created automatically with high precision. In order to provide a solution to this issue, in the present embodiment, a group of templates matching with the aimed impression inputted by the user are determined. Next, a group of after-adjustment images having been subjected to adjustment processing in accordance with the determined templates are generated. Then, impression estimation is performed for a plurality of poster images obtained by synthesizing the group of templates with the after-adjustment images corresponding thereto. Candidate posters are determined based on the impression of the plurality of after-synthesis poster images and the aimed impression inputted by the user. By this means, it is possible to perform impression estimation with high precision and create a plurality of candidate posters automatically. Consequently, it is possible to create a poster that gives a user-demanded impression automatically with high precision.

Figure 9:
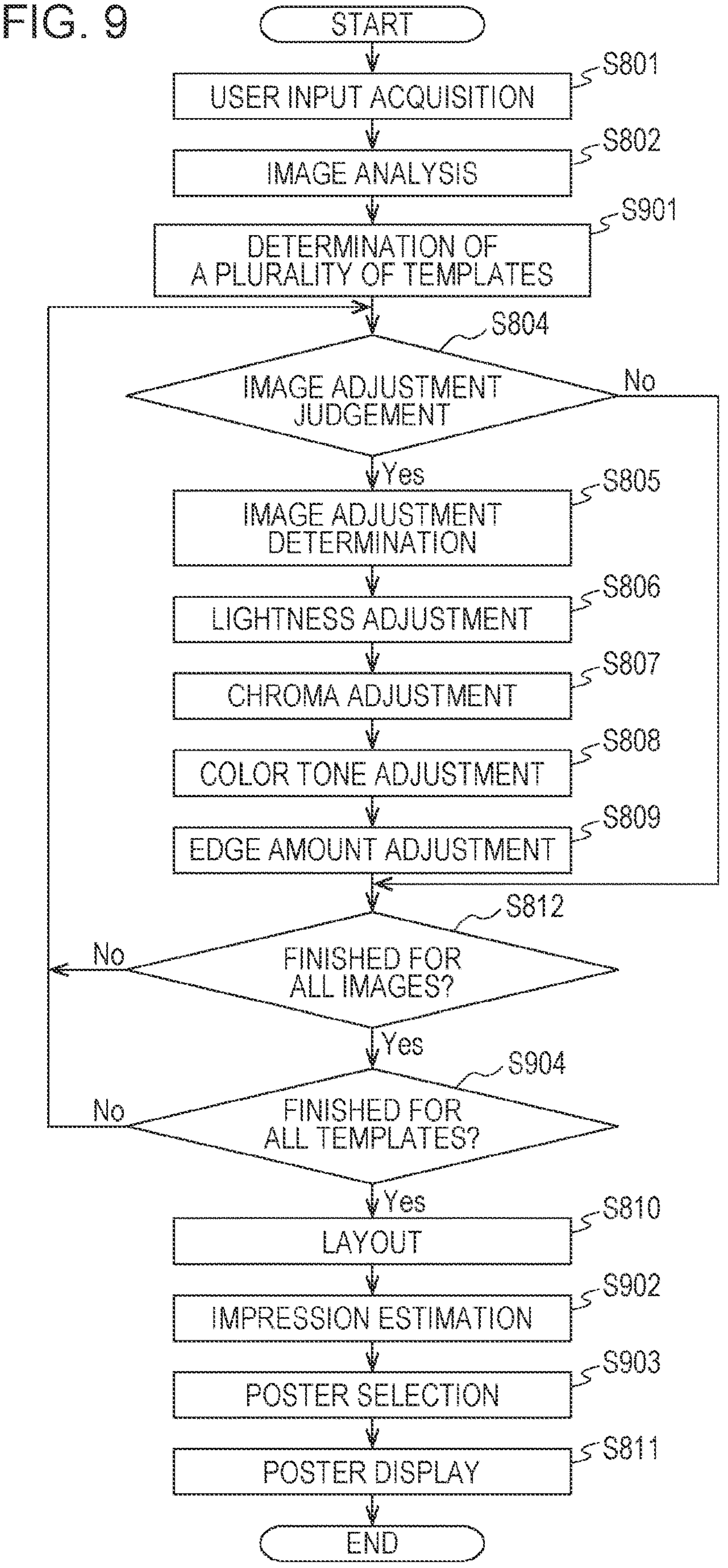
FIG. 9 is a flowchart illustrating poster creation processing according to a second embodiment.

FIG. 9 illustrates a processing flow according to the present embodiment. With reference to FIG. 9, the processing flow will now be described in detail. In processing steps to which the same reference numbers as those of FIG. 8 are assigned, the same processing as that of the first embodiment described above is performed; therefore, the same explanation is not repeated here.

In a step S901, by performing processing similar to that of the step S803, the CPU 101 determines a plurality of templates to be used for automatic poster creation. In the step S803, a single template is determined. By contrast, in the present embodiment, a plurality of templates is determined. The conditions of determination are the same as those of the step S803; however, in order to determine a plurality of templates, templates whose impression is judged to be close to the aimed impression are determined. Specifically, every template whose difference between the template impression and the aimed impression is not greater than 1.0 is selected. The method for calculating the difference from the aimed impression is the same as that of the step S803.

In a step S904, it is determined whether the processing has finished for all of the templates or not. If it is determined that the processing has finished for all of the templates, the process proceeds to the step S810.

In a step S902, the CPU 101 associates, with the poster data, estimated impression obtained by estimating the impression of the poster image having been subjected to rendering in the step S810. By this means, it is possible to assess not only the impression of the individual elements of the poster such as the color arrangement and the layout but also the final impression of the layout-performed poster, including the image and the characters. For example, since the layout differs from one skeleton to another, even when the same color-arrangement pattern is designated, which colors are actually used in which area sizes differs. For this reason, it is necessary to assess the final impression of the poster, not only the tendency of the individual impression of the color-arrangement pattern and the skeleton.

In a step S903, based on the aimed impression having been inputted by the user in the step S801 and the estimated impression having been calculated in the step S902, the CPU 101 selects posters to be presented to the user. In the present embodiment, posters whose number corresponds to "the number of those to be created" designated by the poster creation condition designating unit 201 and whose distance between the aimed impression and the estimated impression is not greater than a predetermined impression difference are selected. A preferred example of a threshold for determining that the distance between the aimed impression and the estimated impression of the poster is not greater than a predetermined impression difference is a value of 1.0 on the axis of the standardized impression. If the number of posters satisfying the condition is not enough for the designated number of those to be created, among posters having differences greater than the predetermined impression difference, an additional selection is made in an ascending order of differences between the aimed impression and the estimated impression of the poster. The selected posters are displayed on the poster preview screen 601 in the step S811.

As described above, impression estimation is performed for a plurality of poster images obtained by synthesizing a group of after-adjustment images having been subjected to adjustment processing in advance with a group of templates. Candidate posters are determined based on the impression of the plurality of after-synthesis poster images and the aimed impression inputted by the user. By this means, it is possible to perform impression estimation with high precision and create a plurality of candidate posters automatically. Consequently, it is possible to create a plurality of candidate posters that give a user-demanded impression automatically with high precision.

Third Embodiment

In the second embodiment described above, a plurality of templates whose impression is close to the aimed impression inputted by the user is selected, and an image adjustment suited for them is performed, thereby creating a poster that gives a user-demanded impression automatically. In this case, depending on the user input of the aimed impression and the text and the image, it might be impossible to bring the impression close to the aimed impression by making an image adjustment. This is because, if the impression of the image is significantly different from the aimed impression, that is, if there is a great distance between the aimed impression and the image impression, it might be impossible to bring the impression close to the aimed impression by making an image adjustment. Moreover, even if applying an intense adjustment to the image brings the impression close to the aimed impression, a problem might arise from such an image adjustment. For example, the adjusted image might look extremely dark or bright, making it impossible to recognize what is pictured therein. A noise contained in the image but unnoticeable before the adjustment might become noticeable when sharpness processing or gamma processing is performed intensely. Color filter processing might change the natural color of the subject such as the color of the skin or the color of the sky significantly, resulting in causing a feeling of strangeness. In order to provide a solution to this issue, in the present embodiment, under conditions that there are restrictions on image adjustment, a feedback is applied to template determination by using the results of poster impression estimation after the synthesis. An image adjustment is determined based on both the impression of the template and the impression of the image. Therefore, when the determined template changes, so does the adjustment processing. That is, it is possible to determine a suitable template for which the results of poster impression estimation match the aimed impression within the limit of adjustment processing such that a problem arising from an image adjustment will not occur. By this means, it is possible to create a poster that gives an impression close to the aimed impression automatically while suppressing a problem arising from an image adjustment.

Figure 11:
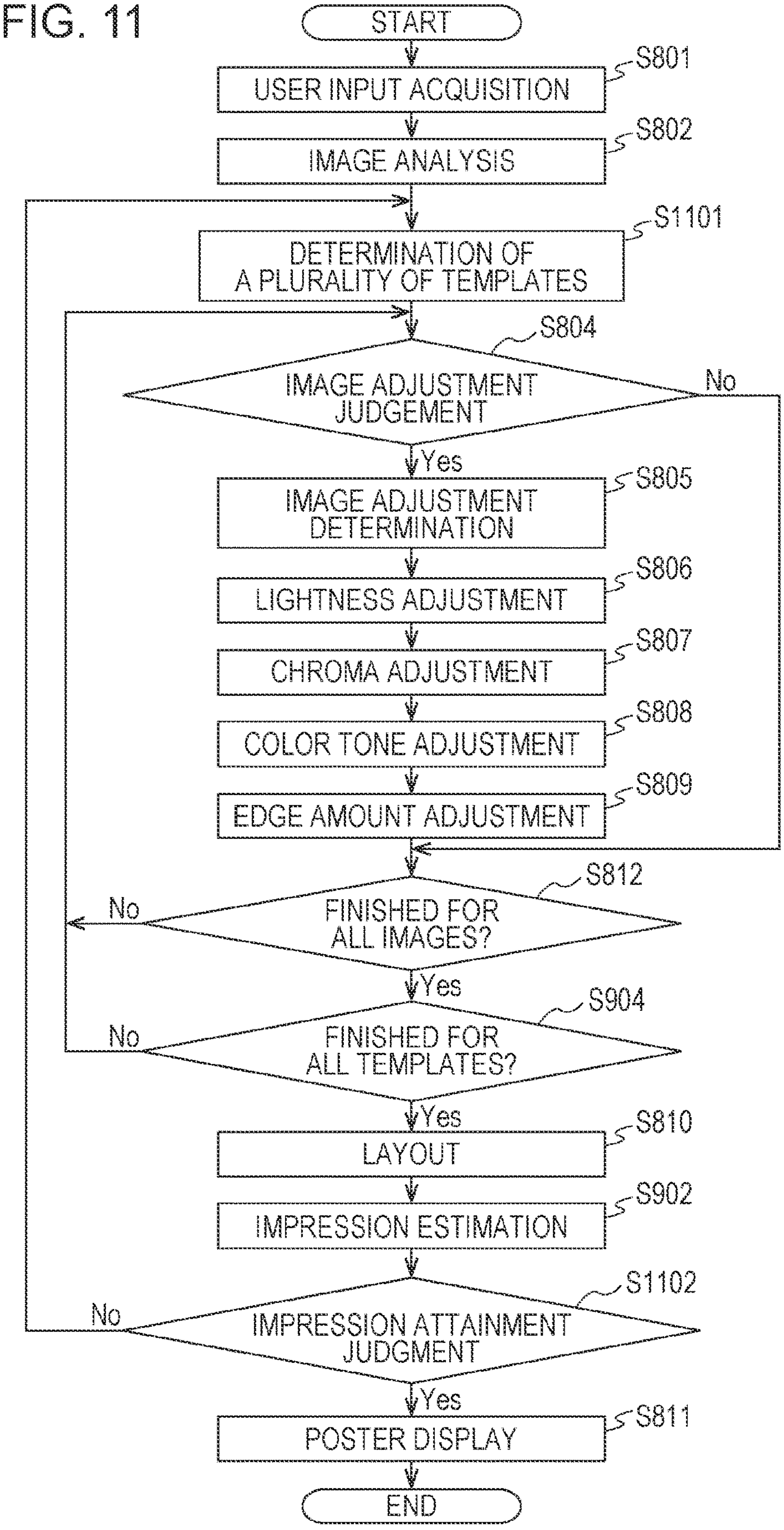
FIG. 11 is a flowchart illustrating poster creation processing according to a third embodiment.

FIG. 11 illustrates a processing flow according to the present embodiment. With reference to FIG. 11, the processing flow will now be described in detail. In processing steps to which the same reference numbers as those of FIG. 9 are assigned, the same processing as that of the second embodiment described above is performed; therefore, the same explanation is not repeated here.

In a step S1101, the CPU 101 determines a plurality of templates from an aimed template impression. When the step S1101 is executed first time, the aimed impression having been inputted in the step S801 is taken as the aimed template impression, and the template determination is performed. In the second and subsequent executions, the template determination is performed from the aimed template impression that was determined in a step S1102. The method for the template determination is the same as that of the step S901.

Figure 12:
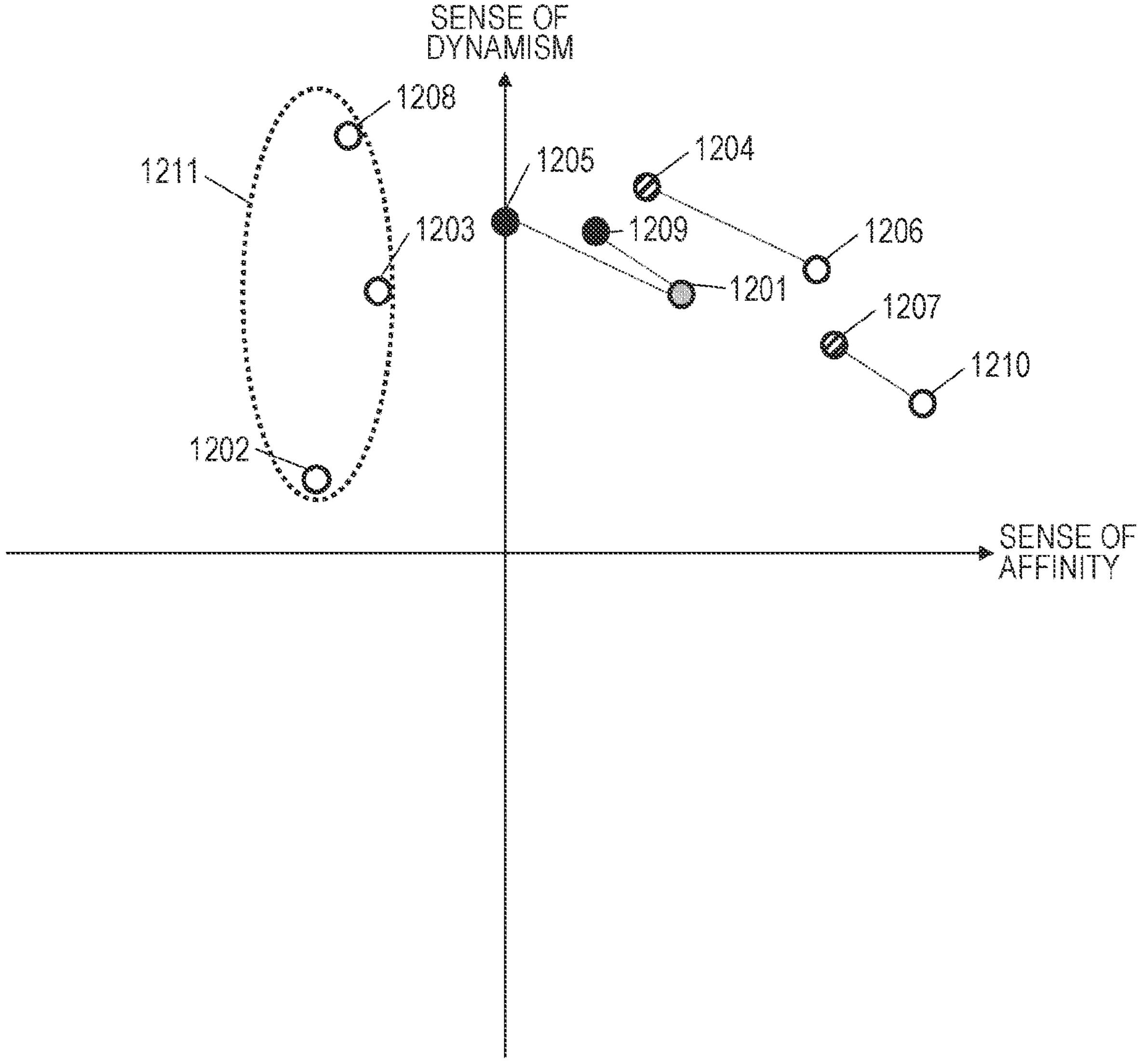
FIG. 12 is a schematic diagram illustrating template determination again according to the third embodiment.

In the step S1102, the CPU 101 determines whether or not the distance between the aimed impression and the poster impression is not greater than a predetermined impression difference. A preferred example of a threshold for the distance between the aimed impression and the estimated impression of the poster is a value of 1.0 on the axis of the standardized impression. A poster is selected when the distance therebetween is not greater than the predetermined impression difference. When the number of posters that have been selected reaches the number designated by the poster creation condition designating unit 201, the selected posters are displayed on the poster preview screen 601. When the number of posters that have been selected has not reached the number designated by the poster creation condition designating unit 201 yet, the process returns to the step S1101, and template determination is performed. In this process, the aimed template impression is set anew, and the template-determining processing of the step S1101 is performed. By performing this processing repeatedly, it is possible to search for a combination of an image adjustment and a template that is closest to the aimed impression inputted by the user. With reference to FIG. 12, a method for searching for the aimed template impression will now be explained in detail. FIG. 12 depicts a two-dimensional space the horizontal axis of which represents a sense of affinity and the vertical axis of which represents a sense of dynamism. In FIG. 12, as an initial state, an aimed impression 1201 is at (a sense of affinity, a sense of dynamism)=(1.0, 2.0), and an image impression 1202 of an inputted image is at (a sense of affinity, a sense of dynamism)=(−1.25, 0.25). An adjustment limit line 1211 for the inputted image is indicated by a dotted line. The adjustment limit is set by setting a maximum value and a minimum value for parameters of adjustment processing performed in the steps S805 to S809. For example, for a gamma adjustment, the minimum value of a gamma coefficient is set to be −1.0, and the maximum value thereof is set to be 1.0. For color filter processing, the maximum value of a coefficient for superimposition of a color filter and an image is set to be 0.2, and the minimum value thereof is set to be 0.0. The maximum value and the minimum value are set also for a sharpness filter, based on a filter size and a filter coefficient. The maximum value and the minimum value described above are just an example. Each adjustment processing may be performed for an evaluation image in advance, and the maximum value and the minimum value of each adjustment processing may be set by performing a visual evaluation. The adjustment limit may be set based on the pixel-value difference between the image before the adjustment and the image after the adjustment. For example, the maximum value of the pixel-value difference between the image before the adjustment and the image after the adjustment may be adopted. Alternatively, a sum value of the pixel-value difference between the image before the adjustment and the image after the adjustment, or an average value thereof, may be adopted. The limit value of the pixel-value difference between the image before the adjustment and the image after the adjustment is set by performing each adjustment processing for an evaluation image in advance and by performing a visual evaluation. If it is determined in the step S1102 that the distance between the aimed impression and the impression of the poster is not greater than a predetermined impression difference, the poster is displayed on the poster preview screen 601 in the step S811.

A specific explanation of the flow described above will now be given. In order to simplify the explanation, one template among the templates having been determined in the step S1101 will be described.

Suppose that, at the time of the first execution, as a result of performing processing from the step S1101 to the step S809, an after-adjustment image impression 1203 is at (a sense of affinity, a sense of dynamism)=(−1.0, 2.0), and a template impression 1204 is at (a sense of affinity, a sense of dynamism)=(0.9, 2.25). A synthesized impression 1205 is at (a sense of affinity, a sense of dynamism)=(0.0, 2.2). This is the result of performing processing of increasing chroma without going beyond the adjustment limit in order to boost a sense of affinity as an image adjustment because the template impression 1204 has a higher level of a sense of dynamism and a lower level of a sense of affinity than the aimed impression 1201. However, as indicated by the adjustment limit line of the image, there is a limit in increasing chroma; therefore, adjustment processing that is enough for reaching the aimed impression cannot be performed. For this reason, the synthesized impression 1205 of the poster is away from the aimed impression 1201 by a distance that is more than a predetermined distance. To overcome this issue, based on the aimed impression 1201 and the synthesized impression 1205, the CPU 101 sets an aimed template impression 1206. The aimed template impression 1206 is obtained by adding, to the template impression 1204, a difference from the synthesized impression 1205 to the aimed impression 1201. In FIG. 12, the aimed template impression 1206 is at (a sense of affinity, a sense of dynamism)=(1.9, 2.05). By this means, it is possible to set an aimed template impression for compensating for, by the template, an impression difference that cannot be compensated for by making an image adjustment. In the step S1101, template determination is performed again based on the aimed template impression 1206. In FIG. 12, the determined template impression 1207 is at (a sense of affinity, a sense of dynamism)=(1.8, 2.5). Since the template impression changes, the results of the image adjustment processing also change. In the template after performing the template determination again, an impression of a high level of a sense of affinity but a low level of a sense of dynamism is inherent. Therefore, adjustment processing for boosting a sense of dynamism is performed within the adjustment limit. In FIG. 12, the adjustment limit line 1211 allows a sense of dynamism to be adjusted into a high level; therefore, an after-adjustment image impression 1208 is at (a sense of affinity, a sense of dynamism)=(3.0, −1.1). In order to enhance a sense of dynamism, for example, sharpness processing with intensity that does not cause visually-recognizable noise strengthening is performed. Since the after-adjustment image and the template change, the impression of the poster after the synthesis also changes. In FIG. 12, a synthesized impression 1209 is at (a sense of affinity, a sense of dynamism)=(0.5, 2.18). As is clear from FIG. 12, the synthesized impression 1209 is closer to the aimed impression 1201 than the synthesized impression 1205 is. Based on the synthesized impression 1209 and the aimed impression 1201, an aimed template impression 1210 is further set. By repeating the above processing, it is possible to bring the distance between the synthesized impression of the poster and the aimed impression into a range of a predetermined distance value or less. The processing described above is performed for all of the plurality of templates having been determined in the step S1101.

Though the aimed template impression is calculated from the difference from the synthesized impression 1205 to the aimed impression 1201 in the present embodiment, the difference may be multiplied by a coefficient. Moreover, the coefficient may be varied depending on the number of times of repetitions. For example, the value of the coefficient may be 2.0 for the first execution, 1.5 for the second execution, and 1.25 for the third execution. By this means, it is possible to reduce the number of times of repetitions and quickly find a poster that gives an impression close to the aimed impression. In the present embodiment, the search described above is performed. The search method is not limited to the above example. Any other search method such as a genetic algorithm method, a neighborhood search method, or a tabu search method may be used.

As described above, when the intensity of an image adjustment is suppressed to an extent that a problem will not occur, the adjustment may be insufficient for bringing the impression close to the aimed impression. If this is the case, the aimed template impression at the time of template determination is set in such a way as to compensate for the insufficiency. By this means, it is possible to supplement the insufficient impression due to the limited image adjustment with the impression of the template. Consequently, it is possible to create a poster that gives an impression close to the aimed impression automatically while suppressing a problem arising from an image adjustment.

Fourth Embodiment

In the third embodiment described above, to create a poster that gives a user-demanded impression automatically, template determination is performed from among templates that have been created in advance. In this case, depending on the user input of the aimed impression and the image and the text, it might be impossible to create a poster that matches with the aimed impression, just by using the templates that have been created in advance. In theory, if an infinite number of templates have been created in advance, it is possible to create a poster that matches with the aimed impression no matter what combination of the aimed impression and the image and the text is designated. However, actually, the number of templates that can be stored is finite, depending on an environment in which the application runs. In order to provide a solution to this issue, in the present embodiment, instead of storing templates, layouts as a constituent of templates (hereinafter referred to as "skeleton"), color arrangement, and fonts are stored in the form of individual databases. Then, template creation is performed automatically by combining them at the time of template determination. By this means, it is possible to create a poster automatically using many templates with a small storage amount.

Consequently, it is possible to create a poster that gives a user-demanded impression automatically.

Figure 13:
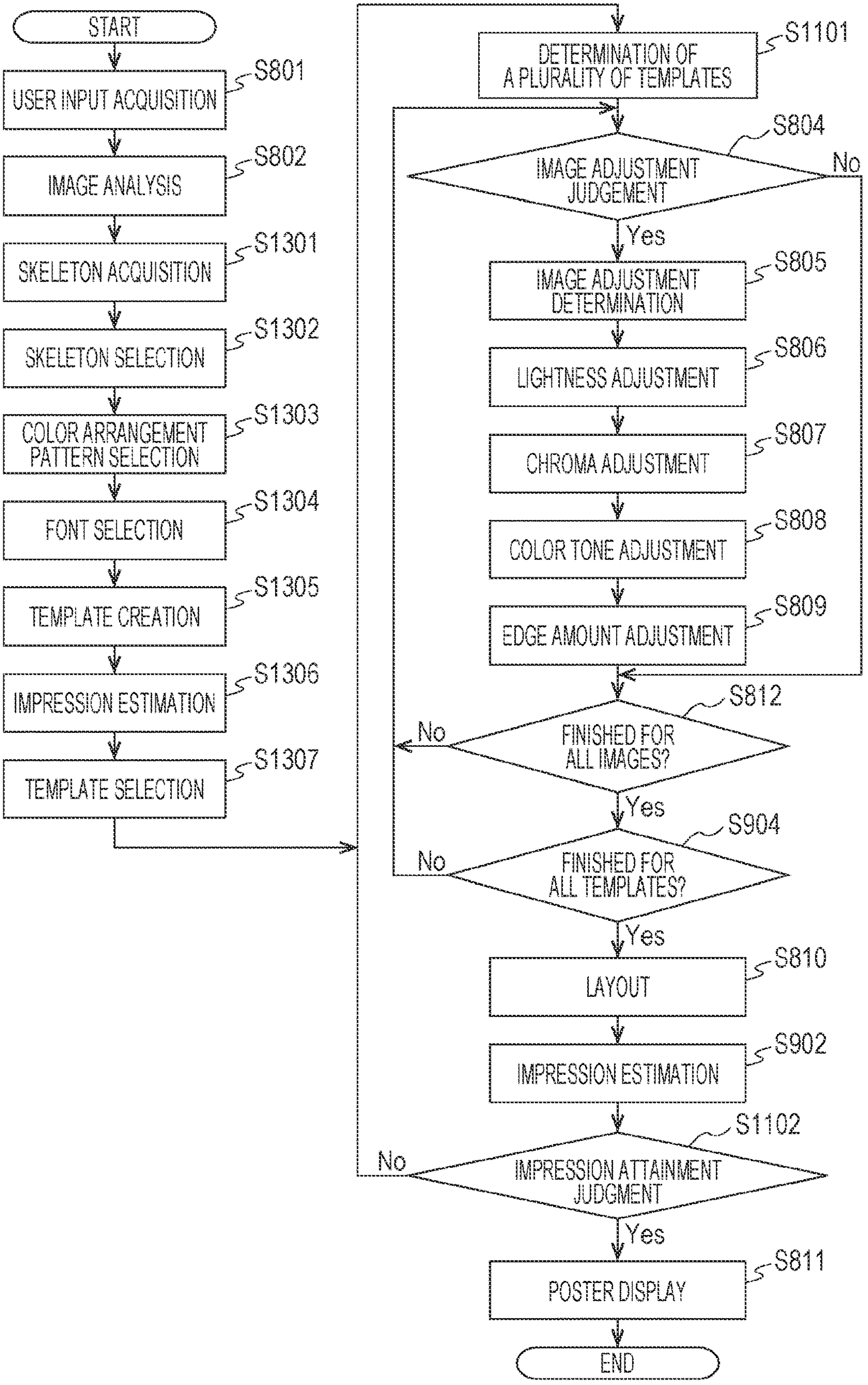
FIG. 13 is a flowchart illustrating template creation according to a fourth embodiment.

FIG. 13 illustrates a processing flow according to the present embodiment. With reference to FIG. 13, the processing flow will now be described in detail. In processing steps to which the same reference numbers as those of FIG. 11 are assigned, the same processing as that of the third embodiment described above is performed; therefore, the same explanation is not repeated here.

In a step S1301, the CPU 101 acquires, from the HDD 104, a group of skeletons that meet the conditions designated by the poster creation condition designating unit 201, the text designating unit 203, and the image designating unit 202. In the present embodiment, it is assumed that each one skeleton is described in one file and is stored in the HDD 104. The CPU 101 reads skeleton files one after another out of the HDD 104 into the RAM 103, retains skeletons that meet the set conditions on the RAM 103, and deletes skeletons that do not meet the set conditions from the RAM 103. For the skeleton having been read into the RAM 103, first, the CPU 101 determines whether the poster size designated by the poster creation condition designating unit 201 agrees with the skeleton size or not. Though matching in size is checked in this example, matching in aspect ratio only may be checked. In this case, the CPU 101 enlarges or reduces the coordinate system of the read skeleton, and acquires skeletons the enlarged or reduced size of which agrees with the poster size designated by the poster creation condition designating unit 201. Next, the CPU 101 determines whether the category of the skeleton agrees with the use category designated by the poster creation condition designating unit 201 or not. For a skeleton that is to be used for a specific use only, its use category is described in its skeleton file so that this skeleton will not be acquired except for a case where this use category is selected. In a case where a skeleton is designed as specific-purpose one, with a particular use in mind, for example, when the skeleton contains a graphic of sports articles that will make the person who sees the poster think of a school, this makes it possible to prevent such a specific-purpose skeleton from being used for a wrong category. Next, the CPU 101 determines whether the number of image objects in the read skeleton agrees with the number of images designated by the image designating unit 202 or not. Finally, the CPU 101 determines whether the text object in the read skeleton agrees with the character information designated by the text designating unit 203 or not. More specifically, it is determined whether the types of the character information designated by the text designating unit 203 are included in the skeleton or not. For example, suppose that character strings are designated in the title box 502 and the text body box 504 on the app screen 501, and a blank is designated in the sub-title box 503.

In this case, a search is executed on all text objects included in the skeleton, and the skeleton is determined as matching one if both a text object for which "title" is set and a text object for which "text body" is set as the types of character information of metadata are found, and the skeleton is determined as non-matching one in other cases. As described above, the CPU 101 retains, on the RAM 103, skeletons for which all of the skeleton size, the number of image objects, and the types of text objects are determined to match with the set conditions. In the present embodiment, the CPU 101 performs the determination for all of the skeleton files stored in the HDD 104; however, this is a non-limiting example. For example, the poster creation application may pre-store a database that associates file paths of skeleton files with search conditions (the skeleton size, the number of image objects, and the types of text objects) in the HDD 104. In this case, the CPU 101 is able to perform skeleton-file acquisition at a high speed by reading not all but only matching skeleton files found as a result of executing a search through the database out of the HDD 104 into the RAM 103.

Figures 14A, 14B, 14C:
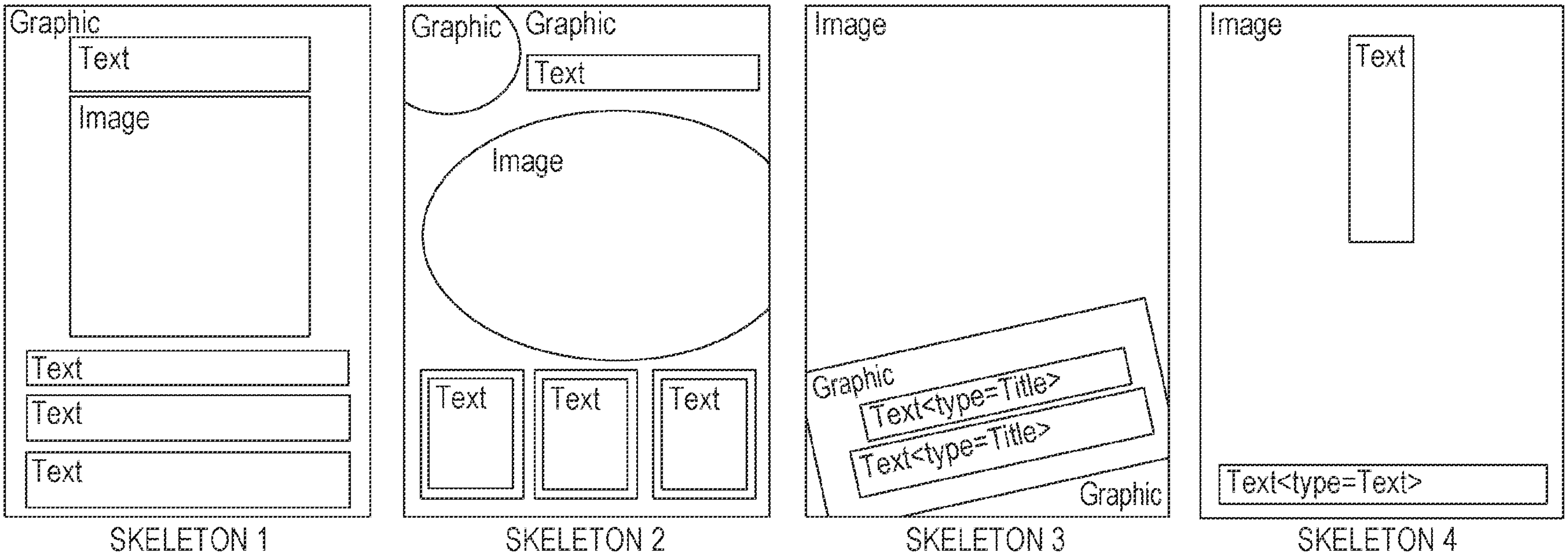
FIG. 14A is a diagram for explaining a method for skeleton selection.
FIG. 14B is a diagram for explaining a method for skeleton selection.
FIG. 14C is a diagram for explaining a method for skeleton selection.

In a step S1302, the CPU 101 selects a group of skeletons matching with the aimed impression designated by the aimed impression designating unit 204 from among the skeletons having been acquired by performing processing in the step S1301. FIGS. 14A, 14B, and 14C are diagrams for explaining a method for skeleton selection by the CPU 101. FIG. 14A is a diagram illustrating an example of a table for associating skeletons with impression. The skeleton-name column in FIG. 14A shows the file names of skeletons, and the columns “a sense of luxury”, “a sense of affinity”, “a sense of dynamism”, and “a sense of massiveness” show how much the skeleton contributes to each item of impression. First, the CPU 101 calculates the distance between the aimed impression acquired from the aimed impression designating unit 204 and the values in the skeleton impression table illustrated in FIG. 14A. For example, if the aimed impression is “a sense of luxury +1, a sense of affinity −1, a sense of dynamism −2, and a sense of massiveness +2”, the distance calculated by the CPU 101 has values illustrated in FIG. 14B. In the present embodiment, a Euclidean distance is used as the distance. Next, the CPU 101 selects top N skeletons in an ascending order of the values of the distance illustrated in FIG. 14B. In the present embodiment, top two skeletons are selected. That is, Skeleton 1 and Skeleton 4 are selected.

A fixed value may be set as the value N. Alternatively, the value may be varied depending on the conditions designated by the poster creation condition designating unit 201. For example, if six, the number of those to be created, is designated in the number-of-those-created box 514 on the app screen 501, the poster creation unit 210 creates six posters. In layout processing, posters are created by combining “skeleton”, “color arrangement pattern”, and “font”. For example, if two skeletons, two color arrangement patterns, and two fonts are selected, it is possible to create eight posters, meaning 2×2×2=8; therefore, it is possible to satisfy the condition of the number of those to be created, namely, six. As described here, the number of skeletons selected may be determined depending on the conditions designated by the poster creation condition designating unit 201.

The range of values of each item of impression in the skeleton impression table illustrated in FIG. 14A does not have to be the same as the range of values of impression designated by the aimed impression designating unit 204. In the present embodiment, the range of values of impression designated by the aimed impression designating unit 204 is from −2 to +2, and the range of values of impression in the skeleton impression table may be different from this range. In that case, the distance calculation described above is performed after performing scaling to bring the range of values in the skeleton impression table into concordance with the range of values of the aimed impression. The distance calculated by the CPU 101 is not limited to a Euclidean distance. It is sufficient as long as an inter-vector distance such as a Manhattan distance or cosine similarity can be calculated. If the radio button 512 is set OFF, the corresponding item of aimed impression is excluded from the distance calculation. It is possible to generate the skeleton impression table by, for example, creating a poster on the basis of each skeleton, with the color arrangement pattern fixed, with the font fixed, and with the image and character information to be arranged on the skeleton fixed, and then by estimating the impression thereof. That is, relative characteristics in relation to other skeletons are rendered into the form of a table by estimating the impression of each of posters that are identical to one another in terms of colors, images, etc. that are used but are different from one another in terms of layout. When this is performed, processing for cancelling impression attributable to color arrangement patterns and images that are used should preferably be performed; for example, standardization based on the estimated impression as a whole, or averaging of the impression of a plurality of posters created using a plurality of color arrangement patterns and images from a single skeleton, or the like, should preferably be performed. By this means, it is possible to express the effects of layout in the form of a table, such as, for example, for a skeleton whose image areas are small, graphics and characters, not images, are dominant factors of impression, inclined arrangement of an image and characters enhances a sense of dynamism, and the like. FIG. 14C illustrates a layout example corresponding to Skeletons 1 to 4 illustrated in FIG. 14A. For example, in Skeleton 1, an image object and text objects are arranged in a regular manner, and the area size of an image is small; therefore, this skeleton gives a low level of a sense of dynamism. In Skeleton 2, a graphic object and an image object have a round shape; this skeleton gives a high level of a sense of affinity and a low level of a sense of massiveness. In Skeleton 3, the layout size of an image object is large, and, in addition, an inclined graphic object is superposed on the image object; therefore, this skeleton gives a high level of a sense of dynamism. In Skeleton 4, an image is placed on the entire skeleton area, with the minimum text object; therefore, this skeleton gives a high level of a sense of massiveness and a low level of a sense of dynamism. As described here, an impression varies depending on the layout of images, graphics, and characters. A method for creating the skeleton impression table is not limited to the above example; an estimation may be made based on the features of layout information themselves such as the area size and coordinates of an image and a title character string, or a manual adjustment may be made. The skeleton impression table is stored in the HDD 104. The skeleton selection unit 214 reads the skeleton impression table out of the HDD 104 into the RAM 103 and looks it up.

In a step S1303, the CPU 101 acquires a group of color arrangement patterns matching with the aimed impression designated by the aimed impression designating unit 204 from the HDD 104. A color arrangement pattern is a combination of colors to be used in the poster. The CPU 101 looks up an impression table corresponding to color arrangement patterns and selects a color arrangement pattern(s) in accordance with the aimed impression. FIG. 15A illustrates an example of a color arrangement pattern impression table associating color arrangement patterns with impression. The CPU 101 calculates the distance between columns “a sense of luxury” to “a sense of massiveness” in FIG. 15A and the aimed impression, and selects top N color arrangement patterns in an ascending order of the values of the calculated distance. In the present embodiment, top two color arrangement patterns are selected. The color arrangement pattern impression table is generated by, similarly to the generation of the skeleton impression table, creating posters while changing the color arrangement patterns from one to another, with factors other than the color arrangement pattern fixed, namely, with the skeleton fixed, with the font fixed, and with the image fixed, and then by estimating the impression thereof, thereby rendering the tendency of impression of the color arrangement pattern into the form of a table.

In a step S1304, the CPU 101 acquires a group of fonts matching with the aimed impression designated by the aimed impression designating unit 204 from the HDD 104. A font selection unit 216 looks up an impression table corresponding to fonts and selects a font(s) in accordance with the aimed impression. FIG. 15B illustrates an example of a font impression table associating fonts with impression. The font impression table is generated by, similarly to the generation of the skeleton impression table, creating posters while changing the fonts from one to another, with factors other than the font fixed, namely, with the skeleton fixed, with the color arrangement pattern fixed, and with the image fixed, and then by estimating the impression thereof, thereby rendering the tendency of impression of the font into the form of a table.

In a step S1305, the CPU 101 performs template creation by using the skeletons, the color arrangement patterns, and the fonts that have been selected through the processing from the steps S1302 to S1304. With reference to FIGS. 16 and 17, a detailed explanation of this processing will now be given.

Figures 16A, 16B, 16C:
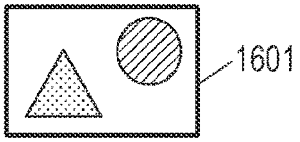
FIG. 16A is a diagram for explaining layout inputting.
FIG. 16B is a diagram for explaining layout inputting.
FIG. 16C is a diagram for explaining layout inputting.
Figure 17A:
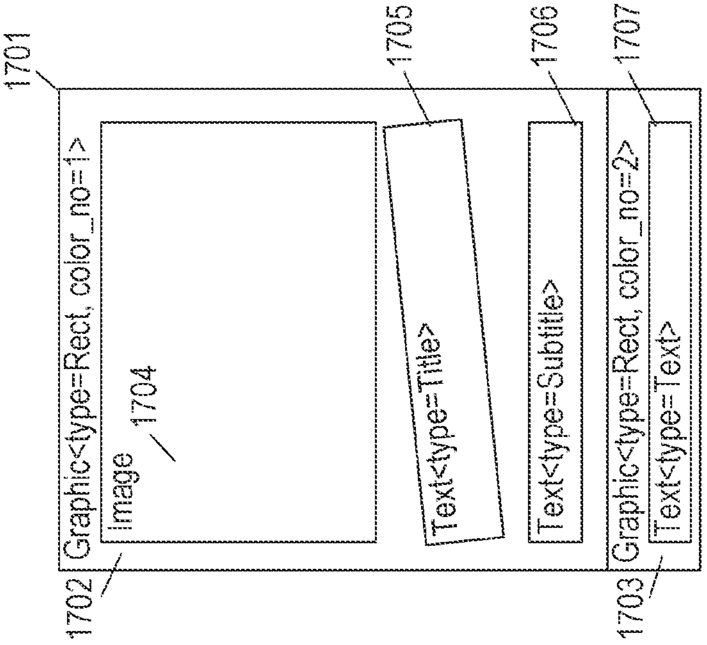
FIG. 17A is a diagram for explaining layout operation.
Figure 17B:
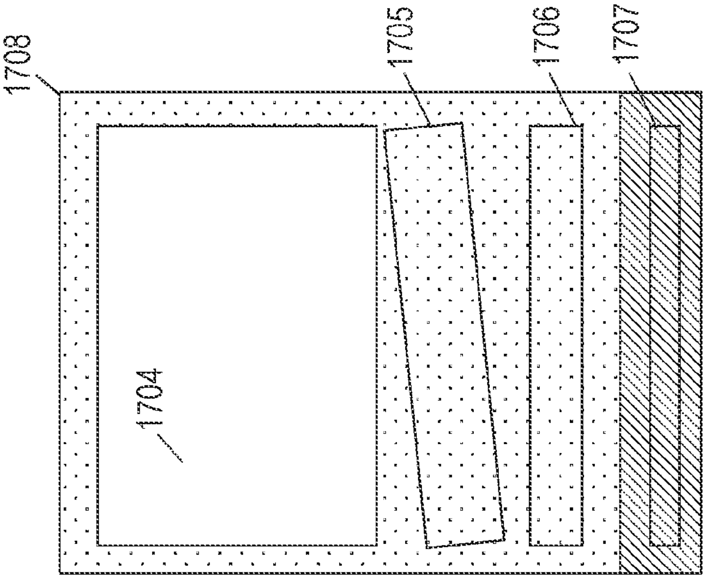
FIG. 17B is a diagram for explaining layout operation.

First, the CPU 101 lists every combination of the skeletons having been selected through the processing in the step S1302, the color arrangement patterns having been selected through the processing in the step S1303, and the fonts having been selected through the processing in the step S1304. Then, the CPU 101 creates poster data by performing layout processing described below for each of these combinations sequentially. For example, if the number of skeletons is three and the number of color arrangement patterns is two and the number of fonts is two, the CPU 101 creates twelve pieces of poster data, meaning 3×2×2=12. Next, the CPU 101 assigns each color arrangement pattern to each skeleton. FIG. 17A illustrates an example of a skeleton. In the present embodiment, an example of assigning a color arrangement pattern having a color arrangement ID1 illustrated in FIG. 16B to a skeleton 1701 illustrated in FIG. 17A will now be described. The skeleton 1701 illustrated in FIG. 17A is made up of two graphic objects 1702 and 1703, one image object 1704, and three text objects 1705, 1706, and 1707. First, the CPU 101 performs color arrangement on the graphic objects 1702 and 1703. Specifically, based on the color arrangement numbers that are metadata described in the graphic objects, corresponding colors are assigned thereto from the color arrangement pattern. Next, the last color in the color arrangement pattern is assigned to the text object whose type of metadata is "title" among the text objects. That is, in the present embodiment, Color 4 is assigned to the text object 1705. Next, for the text objects whose type of metadata is not "title" among the text objects, a character color is set based on the lightness of the background of these non-title text objects. In the present embodiment, the character color is set to be white if the lightness of the background of these non-title text objects is not greater than a threshold, and, if greater than the threshold, black. FIG. 17B illustrates a state of a skeleton 1708 after the color assignment processing described above.

Next, the CPU 101 sets the fonts having been selected through the processing in the step S1304 on the color-arranged skeleton data. FIG. 16C illustrates an example of the selected fonts.

In the present embodiment, font setting is performed for the text objects 1705, 1706, and 1707 of the skeleton 1708. In many instances a conspicuous font is chosen for the title of a poster to make it eye-catching, and an easier-to-read font for the other part of the text. Therefore, in the present embodiment, two types of font, a title font and a text-body font, are selected. The CPU 101 sets the title font for the text object 1705, which corresponds to the title, and the text-body font for the rest, the text objects 1706 and 1707. Though two types of font are selected in the present embodiment, the scope of the present disclosure is not limited thereto. For example, a title font only may be selected. In that case, the CPU 101 uses a font that goes well with the title font as the text-body font. That is, setting a text-body font that matches with the type of the title font suffices; for example, a typical Gothic font that is easy to read is selected for the other part of the text if the font of the title is a Gothic font, or a typical Mincho font is selected for the other part of the text if the font of the title is a Mincho font. Of course, the text-body font may be the same as the title font. Plural fonts may be used selectively depending on how much the user wants the text to draw the attention of the person who sees the poster; for example, the title font is used for the text objects corresponding to the title and the sub-title, or the title font is used for a predetermined font size or larger.

Figure 17C:
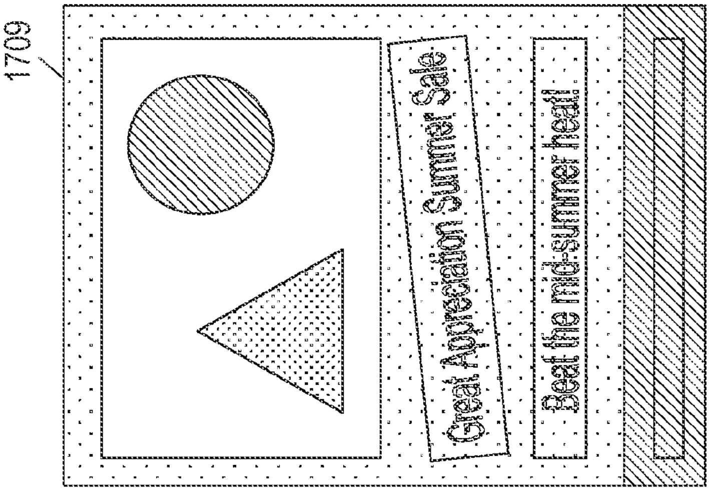
FIG. 17C is a diagram for explaining layout operation.

Next, the CPU 101 arranges the texts designated by the text designating unit 203 on the skeleton data having been subjected to the font setting. In the present embodiment, each text illustrated in FIG. 16A is assigned thereto while referring to the metadata of the text objects of the skeleton. That is, the title "Great Appreciation Summer Sale" is assigned to the text object 1705, and the sub-title "Beat the mid-summer heat!" is assigned to the text object 1706. Nothing is assigned to the text object 1707 because no text has been set for it. FIG. 17C illustrates a skeleton 1709, which is an example of skeleton data after arranging the texts. As described above, in the step S1305, the CPU 101 creates templates based on all combinations.

In a step S1306, the CPU 101 perform impression estimation for each of the templates having been created in the step S1305. How to perform the impression estimation has already been described. Each estimated impression is associated with the corresponding template.

In a step S1307, based on the impression of each template having been created in the step S1306, the CPU 101 performs template determination. In the present embodiment, the CPU 101 selects posters whose distance between the aimed impression and the estimated impression is not greater than a predetermined distance value.

If the number of posters selected is not enough for "the number of those to be created" designated by the poster creation condition designating unit 201, to make up for the insufficiency, the CPU 101 makes an additional selection in an ascending order of the values of distance between the aimed impression and the estimated impression of the poster. Though an additional selection for making up for the insufficiency in the number of posters is performed in the present embodiment, the scope of the present disclosure is not limited thereto. For example, if the number of posters selected is not enough for the number of those to be created, a message for notification of the insufficiency may be displayed on the preview screen 601. As another example, if the number of posters selected is not enough, the process may be returned to the step S1301, and the number of skeletons, the number of color arrangement patterns, and the number of fonts that are selected may be increased.

In the present embodiment, the number of skeletons, the number of color arrangement patterns, and the number of fonts that are selected is determined depending on "the number of those to be created" designated by the poster creation condition designating unit 201. In the step S1305 described above, the CPU 101 creates pieces of poster data the number of which corresponds to the number of skeletons multiplied by the number of color arrangement patterns further multiplied by the number of fonts. When this is performed, the number of skeletons, the number of color arrangement patterns, and the number of fonts that are selected is determined in such a manner that the number of pieces of poster data that are created exceeds the number of those to be created. In the present embodiment, each of the number of skeletons, the number of color arrangement patterns, and the number of fonts is determined in accordance with the formula 2 shown below.

$$\text{Number of those selected} = \left\lceil \sqrt[3]{\text{Number of those to be created} \times 2} \right\rceil \quad (1)$$

For example, if the number of those to be created is six, the number of those selected is three, and, in this case, the number of pieces of poster data created by the layout unit 217 is 27, from among which a poster selection unit 219 selects six pieces of poster data.

By this means, the poster selection unit 219 is able to perform poster selection such that the impression of a poster as a whole matches with the aimed impression from among the created pieces of poster data the number of which is not less than the number of those to be created.

As described above, it is possible to create templates matching with the aimed impression automatically when template determination is performed. By this means, it is possible to create a poster automatically using many templates with a small storage amount. Consequently, it is possible to create a poster that gives a user-demanded impression automatically.

Fifth Embodiment

In the fourth embodiment described above, automatic template creation is performed by combining skeletons, color arrangement patterns, and fonts, which are constituting elements of a poster, based on the aimed impression.

In this case, in order to create a plurality of templates giving an impression close to the aimed impression, there is a possibility that a huge number of combinations might be needed, resulting in a huge amount of processing time. Moreover, looking up fixed tables might make the range of combination patterns narrower in range, and the templates might therefore be unbalanced in terms of variety. In order to provide a solution to this issue, in the present embodiment, based on a genetic algorithm, combinations of template-constituting elements giving an impression close to the aimed impression are searched for. By this means, it is possible to create templates based on a wide range of combinations while reducing the number of combinations. Consequently, it is possible to create templates that are rich in variations while reducing processing time.

Figure 18:
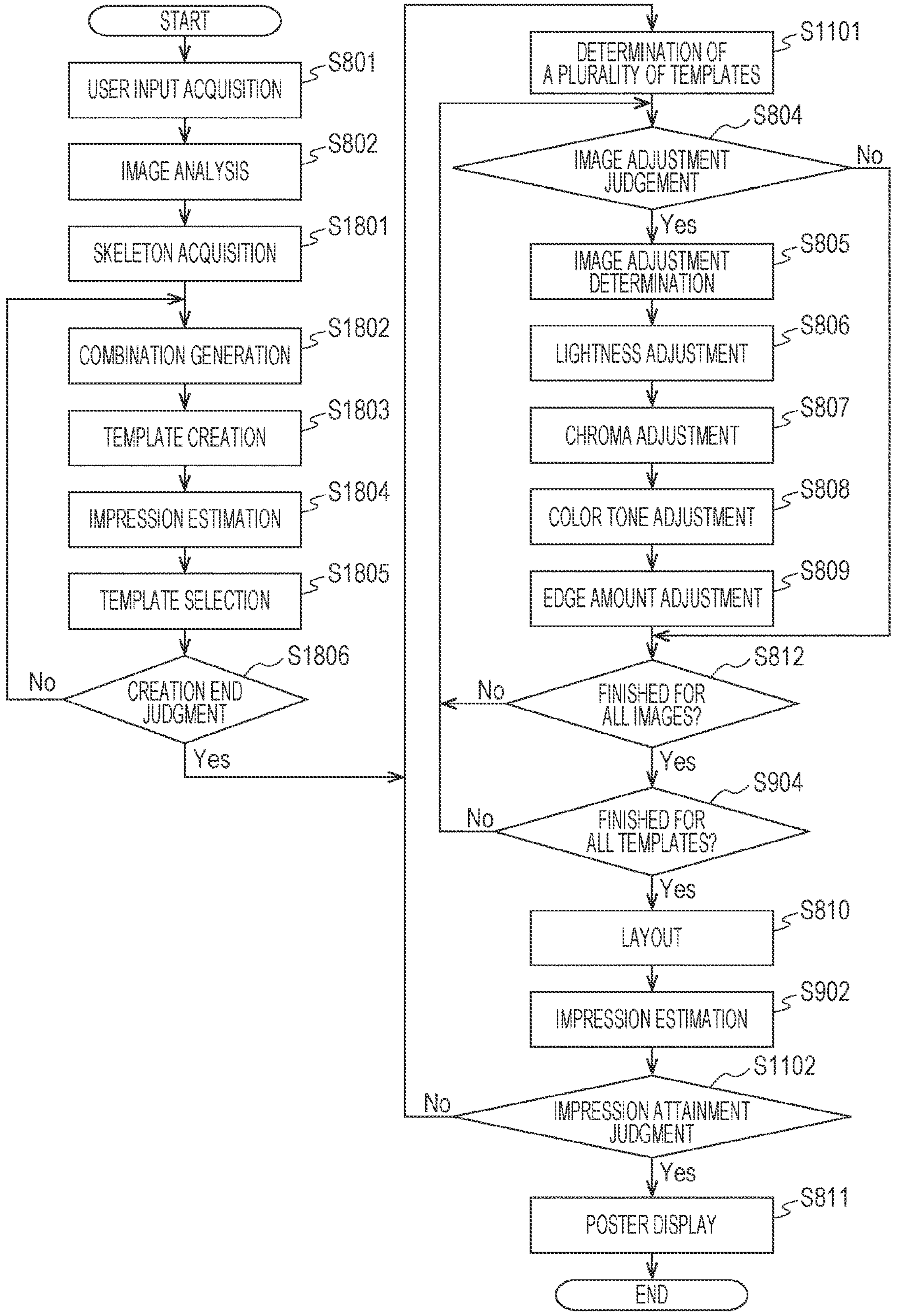
FIG. 18 is a flowchart illustrating template creation according to a fifth embodiment.

FIG. 18 illustrates a processing flow according to the present embodiment. With reference to FIG. 18, the processing flow will now be described in detail. In processing steps to which the same reference numbers as those of FIG. 13 are assigned, the same processing as that of the fourth embodiment described above is performed; therefore, the same explanation is not repeated here.

In a step S1801, the CPU 101 acquires skeletons by performing the same processing as that of the step S1301.

A step S1802 will now be described separately for operation performed at the time of the first execution and for operation performed at the time of the second and subsequent executions in loop processing. First, when the step S1802 is executed first time, the CPU 101 acquires a table of skeletons, a table of color arrangement patterns, and a table of fonts that are used for poster creation. FIGS. 19A to 19D are diagrams for explaining tables used in the step S1802. FIG. 19A illustrates a list of skeletons acquired in the step S1801. FIGS. 19B and 19C illustrate a list of fonts and a list of color arrangement patterns acquired from the HDD 104 respectively in the step S1802. The CPU 101 generates random combinations from the three tables mentioned above.

In the present embodiment, one hundred combinations are generated. FIG. 19D is a table of the combinations generated in the present embodiment.

Next, in the second and subsequent executions of the step S1802 in loop processing, the CPU 101 calculates a distance between an estimated template impression having been estimated in a step S1804 and the aimed impression, and associates the result with the table of combinations. FIGS. 20A and 20B are diagrams for explaining the operation performed in the second and subsequent executions of the step S1802 in loop processing. FIG. 20A illustrates the results of associating the distances between the estimated template impression and the aimed impression with the table illustrated in FIG. 19D. More specifically, the CPU 101 performs poster creation based on the table illustrated in FIG. 19D in a step S1803, and performs impression estimation for each of the created templates in the step S1804. The column of "distance" in FIG. 20A shows the distance between the aimed impression and the estimated impression of the poster created based on the combination shown in each row of the table. The CPU 101 generates a new combination table from the table illustrated in FIG. 20A. FIG. 20B is a table of newly-created combinations. In the present embodiment, new combinations are generated using tournament selection and uniform crossover in a genetic algorithm. First, a plurality of combinations the number of which is N is selected randomly out of the table illustrated in FIG. 20A. For example, N=3. Next, from among the selected combinations, top two combinations in an ascending order of distance, meaning closeness to the aimed impression, are selected. Finally, new combinations are generated by performing random replacement of each combination element (skeleton ID, color arrangement ID, font ID) in the selected two combinations.

For example, a combination ID1 and a combination ID2 that are illustrated in FIG. 20B are results generated from a combination ID1 and a combination ID3 that are illustrated in FIG. 20A; the color arrangement ID is replaced here. One hundred new combinations generated as the result of repeating the above processes are illustrated in FIG. 20B.

By this means, it is possible to search for combinations efficiently based on the distance between the aimed impression and the estimated impression. Though one hundred combinations are generated in the present embodiment, the scope of the present disclosure is not limited to this example. In addition, though tournament selection and uniform crossover are used in the present embodiment, the scope of the present disclosure is not limited to this example. Any other method such as ranking selection, roulette selection, one point crossover, or the like may be used. Mutations may be introduced so as to avoid falling into a trap of a local optimal solution. Though skeletons (layout), color arrangement patterns, and fonts are used as elements that make up the poster that is searched for, any other element may be used. For example, a plurality of patterns to be inserted into the background of a poster may have been prepared in advance, and a search may be executed to determine which pattern should be used and which pattern should not be used. Increasing the number of constituting elements that are the target of the search makes it possible to create a wider variety of posters and broaden the scope of impression expression.

In a step S1805, the CPU 101 calculates the distance between the estimated template impression and the aimed impression and creates a table that is the same as the table illustrated in FIG. 20A. The CPU 101 retains, on the RAM 103, poster data whose distance from the aimed impression is not greater than a threshold.

In a step S1806, the CPU 101 determines whether the number of pieces of poster data having been retained in the step S1805 has reached "the number of those to be created" designated in the number-of-those-created box 514 or not. If it has reached the number of those to be created, the poster creation processing is ended. If it has not reached the number of those to be created yet, the process returns to the step S1802.

In the present embodiment, a search for combinations of elements that make up a template is performed using a genetic algorithm. However, the search method is not limited to this example. Any other search method such as a neighborhood search method or a tabu search method may be used.

As explained above, with the present embodiment, by searching for combinations of constituting elements that are used for poster creation, it is possible to efficiently create a poster that gives an impression of the poster as a whole matching with the aimed impression. This is effective especially when a poster is created in accordance with images and character information that are inputted by a user. For example, suppose that a user wants to create a poster that gives a calm impression when the poster is viewed as a whole, though an image included in the poster looks dynamic. In the present embodiment, it is possible to search for combinations of skeletons, color arrangement patterns, and fonts that give an impression close to the aimed impression by evaluating the impression of the poster as a whole. Therefore, it is possible to control the constituting elements making up the poster suitably for balancing with the image, for example, in order to soften the impression of the image, by using a skeleton that has a small image area size or by using fonts and color arrangements that are calmer than otherwise. With the present embodiment, it is possible to find optimal combinations of the constituting elements making up the poster for the impression of the poster as a whole and create a variety of posters giving an impression close to the aimed impression.

The disclosed concept can be embodied also by using one or more function-implementing circuits (e.g., ASIC).

With the embodiments described above, it is possible to create a poster appropriately while adjusting an image in such a way as to express an impression intended by a user.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-104049, filed Jun. 28, 2022, which is hereby incorporated by reference herein in its entirety.

What is claimed is:

1. An information processing apparatus, comprising:

at least one processor; and a memory that stores a program which, when executed by the at least one processor, causes the at least one processor to function as:

an image acquisition unit configured to acquire an image;

a receiving unit configured to receive an input of aimed impression from a user via a setting screen;

a selecting unit configured to, based on the aimed impression, select a template image from among a plurality of template images;

a determining unit configured to, based on an impression set for the selected template image, an impression of the acquired image, and the aimed impression, determine whether or not to adjust the acquired image;

an image adjustment unit configured to, based on the aimed impression, adjust the image in a case where the determining unit determines that the acquired image be adjusted;

a poster creation unit configured to create a poster by using the adjusted image and the selected template image; and a storage unit configured to store a table in which, for each of a plurality of different items of aimed impression, information for making an image adjustment is contained in an associated manner, wherein based on the aimed impression and the table, the image adjustment unit adjusts the image, and wherein the input of the aimed impression is received from the user by selecting one value from a range of values for at least one impression from the plurality of different items that comprise the aimed impression, and wherein, in a case where a distance, to the aimed impression, of an average of the impression of the acquired image and the impression set for the selected template image is not less than a threshold, the determining unit determines that the acquired image be adjusted.

2. The information processing apparatus according to claim 1, wherein the at least one processor further functions as:

a display control unit configured to display a screen for receiving the input of the aimed impression, wherein the receiving unit receives the input of the aimed impression via the screen.

3. The information processing apparatus according to claim 1, wherein based on the adjusted image and the aimed impression, the poster creation unit creates the poster.

4. The information processing apparatus according to claim 3, wherein a difference between an impression given by the poster created by the poster creation unit and the aimed impression is not greater than a predetermined threshold.

5. The information processing apparatus according to claim 1, wherein the at least one processor further functions as:

a character acquisition unit configured to acquire characters, and based on the adjusted image, the characters, and the aimed impression, the poster creation unit creates the poster.

6. The information processing apparatus according to claim 3, wherein based on the aimed impression, the poster creation unit creates the poster by changing a layout of any of an image included in the poster, characters included in the poster, or a graphic included in the poster.

7. The information processing apparatus according to claim 1, wherein the image adjustment unit adjusts any of lightness, chroma, hue, and an edge amount of the image.

8. An information processing apparatus control method, comprising:

acquiring an image;

receiving an input of aimed impression from a user via a setting screen;

selecting, based on the aimed impression, a template image from among a plurality of template images;

determining, based on an impression set for the selected template image, an impression of the acquired image, and the aimed impression, determine whether or not to adjust the acquired image;

adjusting, based on the aimed impression, the image in a case where it is determined that the acquired image be adjusted;

creating a poster by using the adjusted image and the selected template image; and storing a table in which, for each of a plurality of different items of aimed impression, information for making an image adjustment is contained in an associated manner, wherein based on the aimed impression and the table, the adjusting step adjusts the image, and wherein the input of the aimed impression is received from the user by selecting one value from a range of values for at least one impression from the plurality of different items that comprise the aimed impression, and wherein, in a case where a distance, to the aimed impression, of an average of the impression of the acquired image and the impression set for the selected template image is not less than a threshold, it is determined that the acquired image be adjusted.

9. The information processing apparatus control method according to claim 8, further comprising:

displaying a screen for receiving the input of the aimed impression, wherein the input of the aimed impression is received via the screen.

10. The information processing apparatus control method according to claim 9, wherein the poster is created based on the adjusted image and the aimed impression.

11. The information processing apparatus control method according to claim 10, wherein a difference between an impression given by the created poster and the aimed impression is not greater than a predetermined threshold.

12. The information processing apparatus control method according to claim 8, further comprising:

acquiring characters, wherein the poster is created based on the adjusted image, the characters, and the aimed impression.

13. The information processing apparatus control method according to claim 10, wherein based on the aimed impression, the poster is created by changing a layout of any of an image included in the poster, characters included in the poster, or a graphic included in the poster.

14. A non-transitory computer-readable storage medium storing a program configured to cause a computer of an information processing apparatus to function as:

an image acquisition unit configured to acquire an image;

a receiving unit configured to receive an input of aimed impression from a user via a setting screen;

a selecting unit configured to, based on the aimed impression, select a template image from among a plurality of template images;

a determining unit configured to, based on an impression set for the selected template image, an impression of the acquired image, and the aimed impression, determine whether or not to adjust the acquired image;

an image adjustment unit configured to, based on the aimed impression, adjust the image in a case where the determining unit determines that the acquired image be adjusted;

a poster creation unit configured to create a poster by using the adjusted image and the selected template image; and a storage unit configured to store a table in which, for each of a plurality of different items of aimed impression, information for making an image adjustment is contained in an associated manner, wherein based on the aimed impression and the table, the image adjustment unit adjusts the image, and wherein the input of the aimed impression is received from the user by selecting one value from a range of values for at least one impression from the plurality of different items that comprise the aimed impression, and wherein, in a case where a distance, to the aimed impression, of an average of the impression of the acquired image and the impression set for the selected template image is not less than a threshold, the determining unit determines that the acquired image be adjusted.

* * * * *